United States Patent
Toft

(10) Patent No.: US 10,880,963 B2
(45) Date of Patent: Dec. 29, 2020

(54) METHOD OF PROVIDING COLOR TEMPERATURE CORRECTION OF A LIGHT BEAM USING A COLOR FILTER SYSTEM

(71) Applicant: Harman Professional Denmark ApS, Aarhus N (DK)

(72) Inventor: Jesper Torsvik Toft, Aarhus N (DK)

(73) Assignee: HARMAN PROFESSIONAL DENMARK APS, Aarhus N (DK)

( * ) Notice: Subject to any disclaimer, the term of this patent is extended or adjusted under 35 U.S.C. 154(b) by 242 days.

(21) Appl. No.: 16/000,870

(22) Filed: Jun. 5, 2018

(65) Prior Publication Data

US 2018/0368217 A1   Dec. 20, 2018

(30) Foreign Application Priority Data

Jun. 20, 2017   (DK) .................................. 2017 70480

(51) Int. Cl.
*H05B 45/20* (2020.01)
*G02B 5/22* (2006.01)
(Continued)

(52) U.S. Cl.
CPC ............ *H05B 45/20* (2020.01); *F21S 10/007* (2013.01); *F21S 10/02* (2013.01); *F21V 9/08* (2013.01);
(Continued)

(58) Field of Classification Search
CPC ... H05B 45/20; F21V 9/38; F21V 9/45; F21V 9/08; F21V 14/08; F21S 10/007;
(Continued)

(56) References Cited

U.S. PATENT DOCUMENTS 5,515,254 A   5/1996 Smith et al.
2003/0206414 A1   11/2003 Wood et al.
(Continued)

FOREIGN PATENT DOCUMENTS

WO   01/37032 A2   5/2001

OTHER PUBLICATIONS

Danish Search Report for Application No. PA 2017 70480, dated Dec. 1, 2017, 10 pages.
(Continued)

*Primary Examiner* — Thomas K Pham
*Assistant Examiner* — Mitchell T Oestreich
(74) *Attorney, Agent, or Firm* — Artegis Law Group, LLP

(57) ABSTRACT

An approach for controlling a light fixture comprising one light source and 3 different color filters, where the color filters can be arranged in a number of positions in relation to one another and in relation the light. The method comprises the steps of receiving a color parameter relating to the position of the color filters and a color temperature parameter relating to the color temperature of the light, obtaining a resulting color based on color parameter, the color temperature parameter and spectral characteristics of the filters, obtaining color filter position parameters indicating the position of the filters based on the resulting color, the spectral characteristics of the filters and spectral characteristic of said light; and arranging the color filters in relation to one another and in relation to said light based on color filter parameters.

16 Claims, 9 Drawing Sheets

(51) Int. Cl.
 *F21V 9/08*    (2018.01)
 *F21S 10/02*   (2006.01)
 *F21S 10/00*   (2006.01)
 *G02B 26/00*   (2006.01)
 *F21V 9/45*    (2018.01)
 *F21V 14/08*   (2006.01)
 *F21V 9/38*    (2018.01)
 *F21Y 115/10*   (2016.01)
 *F21W 131/406*  (2006.01)

(52) U.S. Cl.
 CPC ............... *F21V 9/38* (2018.02); *F21V 9/45* (2018.02); *F21V 14/08* (2013.01); *G02B 5/22* (2013.01); *G02B 26/007* (2013.01); *F21W 2131/406* (2013.01); *F21Y 2115/10* (2016.08)

(58) Field of Classification Search
 CPC ......... F21S 10/02; G02B 5/22; G02B 26/007; F21Y 2115/10; F21W 2131/406
 USPC ........................................................ 359/891
 See application file for complete search history.

(56) References Cited

U.S. PATENT DOCUMENTS

| | | |
|---|---|---|
| 2005/0018423 A1* | 1/2005 | Warnecke ............... F21S 10/02 |
| | | 362/230 |
| 2006/0007686 A1 | 1/2006 | Hough |
| 2009/0196043 A1 | 8/2009 | Calmes |
| 2009/0231854 A1 | 9/2009 | Jurik |
| 2012/0176042 A1 | 7/2012 | Hatley et al. |
| 2012/0176063 A1* | 7/2012 | Hatley ................... H05B 45/20 |
| | | 315/297 |
| 2012/0262923 A1 | 10/2012 | Jurik |
| 2014/0085901 A1 | 3/2014 | Calmes |

OTHER PUBLICATIONS

Extended European Search Report for application No. 18178745.8 dated Oct. 9, 2018.

\* cited by examiner

METHOD OF PROVIDING COLOR TEMPERATURE CORRECTION OF A LIGHT BEAM USING A COLOR FILTER SYSTEM

CROSS-REFERENCE TO RELATED APPLICATIONS

This application claims the priority of co-pending Denmark patent application titled, "METHOD OF PROVIDING COLOR TEMPERATURE CORRECTION OF A LIGHT BEAM USING A COLOR FILTER SYSTEM" filed on Jun. 20, 2017 and having Serial No. PA 2017 70480. The subject matter of this related application is hereby incorporated herein by reference Field of the Invention The present invention relates to a light fixture comprising at least one light source generating a light beam, which propagates along a primary optical axis and where a plurality of color filters is configured to gradually move into the light beam to change the color and color temperature of the light beam.

BACKGROUND OF THE INVENTION

In order to create various light effects and mood lighting in connection with concerts, live shows, TV shows, sport events or as a part of an architectural installation light fixtures creating various light effects are getting more and more used in the entertainment industry. Typically entertainment light fixtures creates a light beam having a beam width and a divergence and can for instance be wash/flood light fixtures creating a relatively wide light beam or it can be projecting fixtures configured to projecting images onto a target surface.

Typically the light beam can create a large number of colors for instance by using the techniques of additive color mixing or subtractive color mixing. In additive color mixing light from light sources emitting different colors are mixed together in order to create a mixed light beam where the color of the mixed light beam can varied by changing the intensity of the light sources in relation to each other. In subtractive color mixing a number of color filter are inserted into the light beam from at least one light source and the color filter subtracts optical wavelengths from the light beam in order to create a certain color. As consequence in subtractive color mixing a light source emitting white light is often used.

GB 629266 discloses a system of color lighting control which can be employed in conjunction with any type of light source. The system comprises a light source with or without an optical reflecting and condensing system and with which is incorporated a magazine of color filters arranged so that the whole of the light falling upon the stage passes through these filters. Means are provided to move independently each of these filters into a number of different positions in relation to one another and in relation to the beam of light passing through them. Each filter is of sufficient width to cover the aperture of the beam of light and is constructed of glass, gelatin, plastic or other suitable transparent or translucent colored medium. One end of the filter is completely colorless over an area corresponding to the aperture of the beam, the opposite end of the filter is completely colored over a like area The remaining portion of the filter between these two areas is partly colorless and partly colored in such a manner that the proportion of colored area to colorless area progressively increases from the colorless end to the completely colored end. This system cannot perform color temperature correction.

U.S. Pat. No. 4,602,321 disclose a variable light source includes a light which projects a white light beam. Three filters sets each include three pivotable dichroic filter elements. Each element is rotatable around an axis perpendicular to the light beam in order to vary the angle of incidence to vary the hue of the light beam. Rotation of the filter elements also varies the white light transmitted past the filter elements in order to vary the saturation of the light.

U.S. Pat. No. 5,622,426 disclose a wash light, having a lamp surrounded by a reflector, a field stop with a fixed aperture, a frame for holding color/diffusion/dowser panels, and a lens located immediately adjacent the frame The frame is arranged downstream of the field stop holds a plurality of panels where one panel. The panel 34 and three of the other panels are dichroic filters preferably of the colors cyan, magenta and amber, as well as a color correction C.T.O. filter. The use of a variable C.T.O. filter gives a greater range of reds and pinks, as well as enhanced blue-green performance. This also allows the light to be utilized with standard incandescent fixtures as it can be color corrected to 3200 degrees Kelvin. These four panels and the frame form means for colorizing the light beam. The panels operate by sliding relative to the frame allowing one or more of the panels to move into the light beam and thereby change its color.

WO0137032 discloses that a common configuration of subtractive tristimulant color mixing system uses three filters, colored cyan, magenta and yellow (CMY color mixing). A further refinement may use a color temperature correction filter (CTC) in addition which can be used to increase the gamut of available colors, but more particularly is used to vary the color temperature of white light output. Any set of primary colors could be used to perform such color mixing, however conventionally red, green, blue color filters (RGB) are the only alternative to CMY actually used. Any reference in the following text to CMYC filters is equally applicable to any set of primary color filters (plus CTC) and it is assumed that such alternatives are incorporated in any claims made. FIG. 6 of WO0137032 shows a side view of color mixing system using three filter sets of colored comblike structures for CMY and one set for CTC in a compact construction, WO9114635 discloses a color changing system for a light fixture having a pair of cyan filters, a pair of magenta filters, a third pair of yellow filters and a fourth pair provides color temperature correction (for example to make the light beam generated by a metal halide lamp appear to have the color temperature of an incandescent lamp).

The color mixing systems shown in WO WO0137032 and WO09114635 are relative large and takes up much space in the light fixtures.

Light designers and programmers want as many effects as possible in a lighting apparatus as this give the light designer and programmers a lot of options when creating light shows. However, it is difficult to provide lighting apparatus with many effects as each kind of the light effect components take up space in the lighting apparatus.

DESCRIPTION OF THE INVENTION

The objective of the present invention is to provide a compact light fixture with CMY color mixing and color temperature correction functionality. A method and a light fixture as defined by the independent claims can achieve this. The benefits and advantages of the present invention are disclosed in the detailed description and illustrated ty drawings. The dependent claims define different embodiments of the invention.

DETAILED DESCRIPTION OF THE INVENTION

The present invention is described in view of exemplary embodiments only intended to illustrate the principles of the present invention. The skilled person will be able to provide several embodiments within the scope of the claims. In the illustrated embodiments, the illustrated light beams and optical components do only serve to illustrate the principles of the invention rather than illustrating exact and precise light beams and optical components. Throughout the description, the reference numbers of similar elements providing similar effects have been given the same last two digits.

Figure 1:
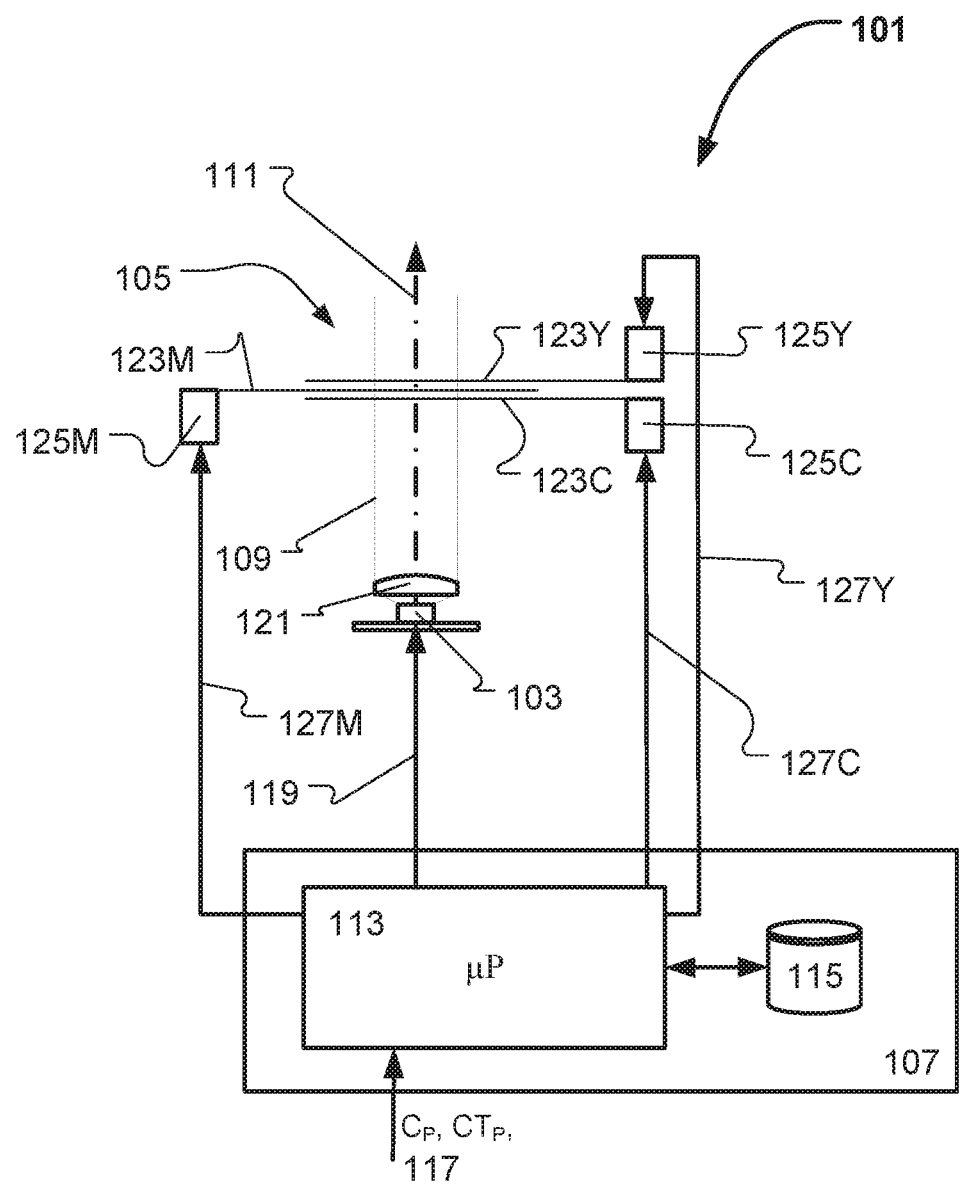
FIG. 1 illustrates a structural diagram of a light fixture according to the present invention.

FIG. 1 illustrates a structural diagram of a light fixture 101 according to the present invention. The light fixture comprises at least one light source 103, a plurality of color filters 105 and a controller 107.

The at least one light source 103 generates at least one source light beam 109 (illustrated as dotted line) propagating along a primary optical axis 111 (illustrated as dash dotted arrow). A light collector 121 is configured to collect light from the light source and convert the collected light into the source light beam. The light collector can be any optical component capable of collecting light from the light source and converting the collected light into a source light beam, for instance optical lenses, TIR lenses, light rods, reflectors etc. It is to be understood that the light collector can be configure to collect light from any positive number of light sources and the light collector can thus be adapted to collect light from a single light source or a plurality of light sources. Also the light collector can in some embodiments be omitted. In the illustrated embodiment, only one light source 103 and corresponding light collector 121 have been illustrated, however it is noticed that in alternative embodiment a plurality of light sources can be provided where each light source provides a source light beam. Further in one embodiment the source light beams can be directed through an optical gate where optical gate can be delimited by an aperture; however it to be understood that a physical aperture can be omitted. The light source is illustrated as an LED (light emitting diode), however it is to be understood that the light source can be any kind of light source, such as OLEDs (Organic light emitting diodes), PLEDs (polymer light emitting diodes), incandescent lamps, discharge lamp, Plasma lamps, light sources based on light converting materials configured to convert electromagnetic radiation into other optical wavelengths.

Figure 9:
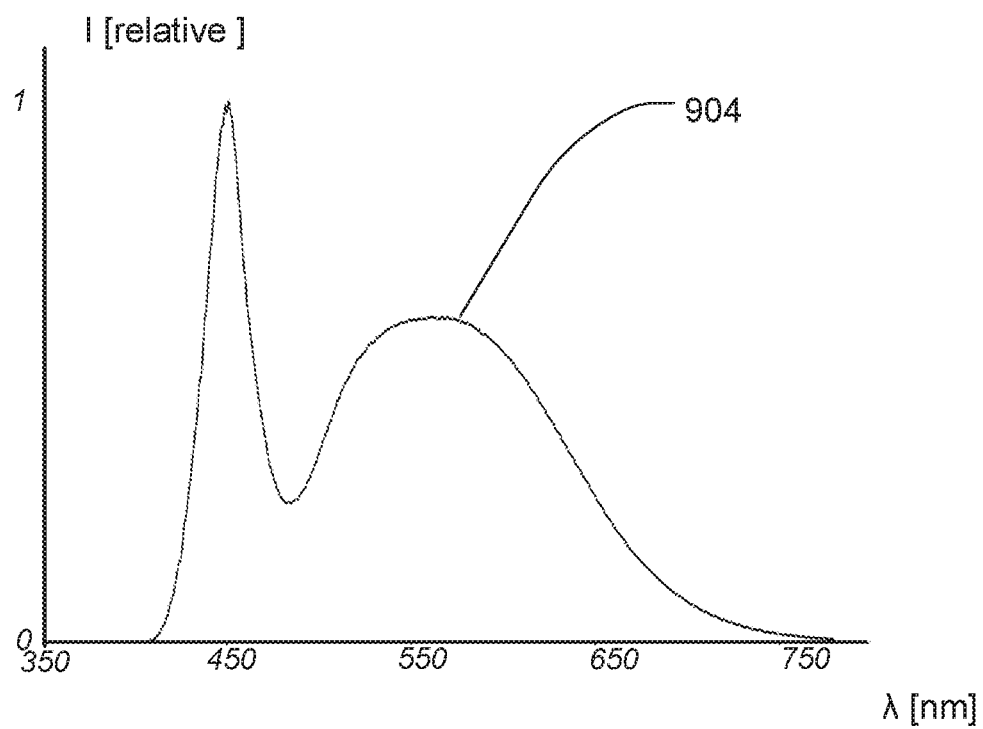
FIG. 9 illustrates an example of the spectral characteristics of a light emitted by a light source.

The light source emits light having emitting light having a spectral characteristic for instance the spectral characteristic illustrated in FIG. 9, which illustrates the relative intensity I of the light emitted by a light source 904, as a function of wavelength λ in nm. In FIG. 9 the relative intensity I of the light source corresponds the relative intensity I of a cold white LED emitting light having a color temperature corresponding to approximately 5800 kelvin, however it is to be understood that the relative intensity depends on the chosen light source.

The controller 107 is configured to control the lighting fixture and the components of the lighting fixture. The controller comprises a processor 113 and a memory 115 and is configured to control the lighting fixture based on an input signal 117 indicative of a positive number of light control parameters specifying how the lighting fixture should be controlled. The light control parameters can be indicative of a color parameter $C_P$ and a color temperature $CT_P$, where the color parameter can indicate the color that the light beam should have and the color temperature parameter indicates the color temperature that the light beam should have. However the input signal may also be indicative of other light control parameters such as strobing, light effects, predetermined light effect functions, pan/tilt position (in case the lighting fixture is a moving head light fixture), or other kind of light control parameters known in the art of intelligent lighting.

The input signal 117 can be any signal capable of communicating parameters and can for instance be based on one of the following protocols USITT DMX 512, USITT DMX 512 1990, USITT DMX 512-A, DMX-512-A including RDM as covered by ANSI E1.11 and ANSI E1.20 standards, Wireless DMX, Artnet or ACN designates Architecture for Control Networks; ANSI E1.17, E1.31. The light control parameters can also be generated from a user interface (not shown) either implemented as a part of the lighting fixture or implemented on an external controller (not shown) which sends the light control parameters to the lighting fixture through the input signal 117. The control parameters can also be obtained from a pre-stored program in the memory 115.

The controller is configured to control the light source 103 through communication line 119 and can turn the light source on and off as desired. Additionally the controller can also be configured to regulate the intensity of the light emitted by the light source for instance by using PWM, AM, FM, binary signals, DC signals etc. The skilled person will be able to provide many kind of communication lines between the controller and the light source for instance by providing a driver which generates an activation signals for the light source based on a control signal from the controller. In embodiments with a plurality of light sources, the light sources can be connected to the same data bus and controlled by the controller through a data bus using addressing. The light sources can be controlled based on the same control signal from the controller or controlled by the same driver. In embodiments with a plurality of light sources the light sources can be arranged in groups of light source which can be independently controlled.

The plurality of color filters 105 are arranged in front of the light source 103 and in the illustrated embodiment the plurality of color filters are provided as three different color filters 123C, 123M and 123Y. Each of the three different color filters has a predetermined spectral filter characteristic, which gradually increases across the color filter such the saturation of the filter (color) varies from 0% to 100% saturation.

The three different color filters can be moved in relation to the light in order to apply the filter gradually into the source light beam 109. Actuators 125C, 125M, and 125Y are thus configured to move the color filters in relation to the light. The color filters are independently movable and can be arranged in a number of different positions in relation to one another and in relation to the light beam 109 by the corresponding actuators 125C, 125M, and 125Y.

The color filters can be provided as linear color filters where the filter characteristics gradually increase across the color filter and the actuators are then configured to gradually insert the color filter into the light. In addition, the color filters can be provided as color wheels where the spectral filter characteristics gradually increase around the center of the color filter and the actuators are then configured to rotate the color filters around the center in order to position different part of the color filter in the light.

Figure 6A:
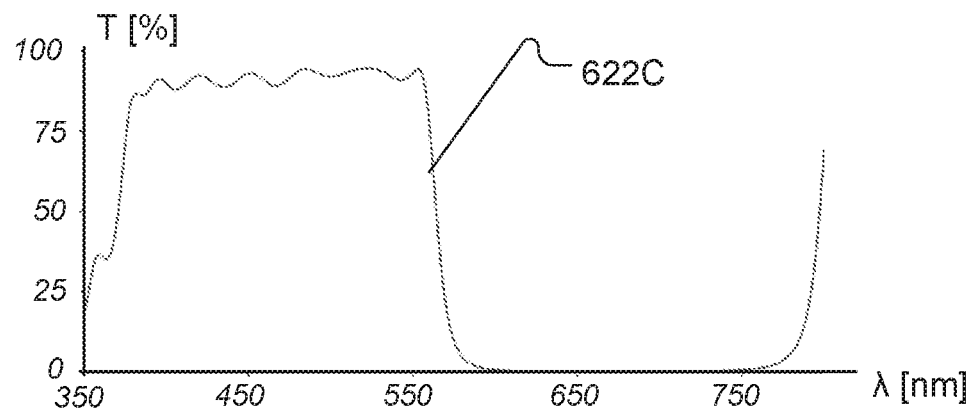
FIGS. 6a-6c illustrate the spectral characteristic of a first, second and third color filter.
Figure 6B:
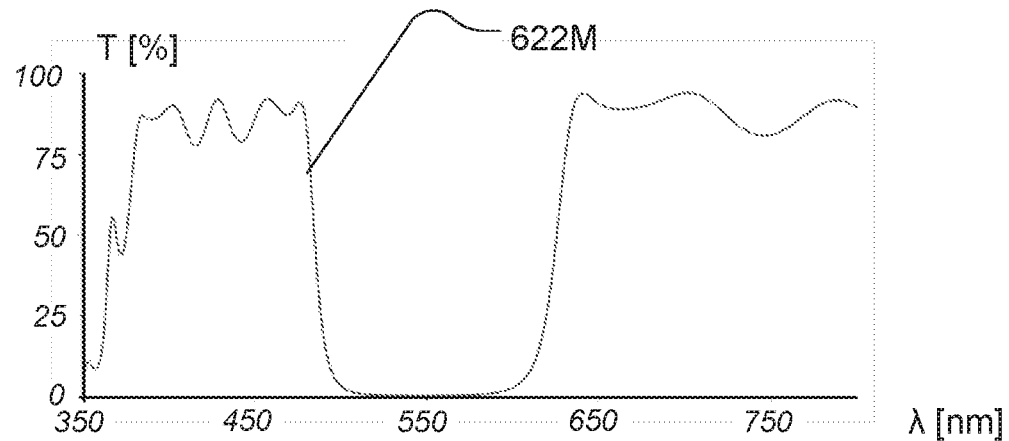
Figure 6C:
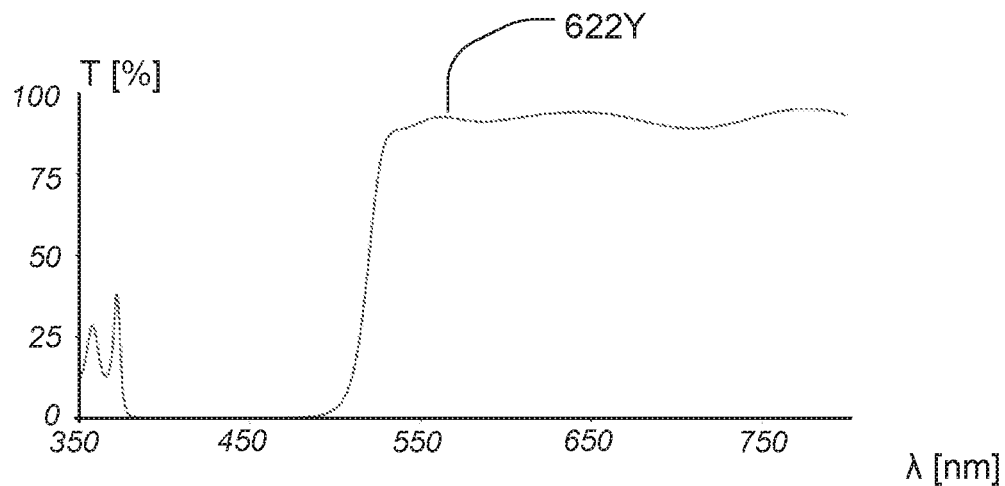

In the illustrated embodiment the color filters 123C, 123M and 123Y are respectively provided as respectively a cyan dichroic filter, a magenta dichroic filter and a yellow dichroic filter. The spectral characteristic of a cyan filter 622C, the spectral characteristic of a magenta filter 622M and the spectral characteristic of a yellow dichroic filters 622Y are illustrate in respectively FIGS. 6a, 6b and 6c. Each graph illustrates the percentage transmission T of light through the filter, when the filter is fully applied to the light, as a function of wavelength λ in nm.

It is to be understood that the color filters can have other filtering characteristics and can be provided as any filter capable of coloring the light beam 109; for instance dichroic filters, colored gels or other means of coloring as known in the art of entertainment lighting.

The controller is configured to control the actuators 125C, 125M, and 125Y through communication lines 127C, 127M and 127Y for instance in order to insert, move a color filter 123C, 123M, or 123Y interaction to the light whereby the effect of the moved color filter of the light is changed.

The controller 107 is configured to control the position of the color filters in relation to the light beam by obtaining a resulting color based on:
at least one color parameter relating to the position of the color filters;
at least one color temperature parameter relating to the color temperature of the light;
predetermined spectral filter characteristics of the color filters;
and then arrange the color filters in relation the light based on;
the resulting color;
predetermined spectral filter characteristics of the color filters; and
predetermined spectral characteristics of the light emitted the light source The controller sends corresponding control signals to the actuators 125C, 125M 125Y through communication lines 127C, 127M and 127Y whereby the color filters are arranged in the light beam in order to create a color indicated by the color parameter at a color temperature indicated by the color temperature parameter.

The controller can receive the color parameter and color temperature parameter via the input signal 117, from the memory or from a user interface at the light fixture (not shown). The controller can comprise instructions control the position of the color filters according the method as described hereafter.

Figure 2:
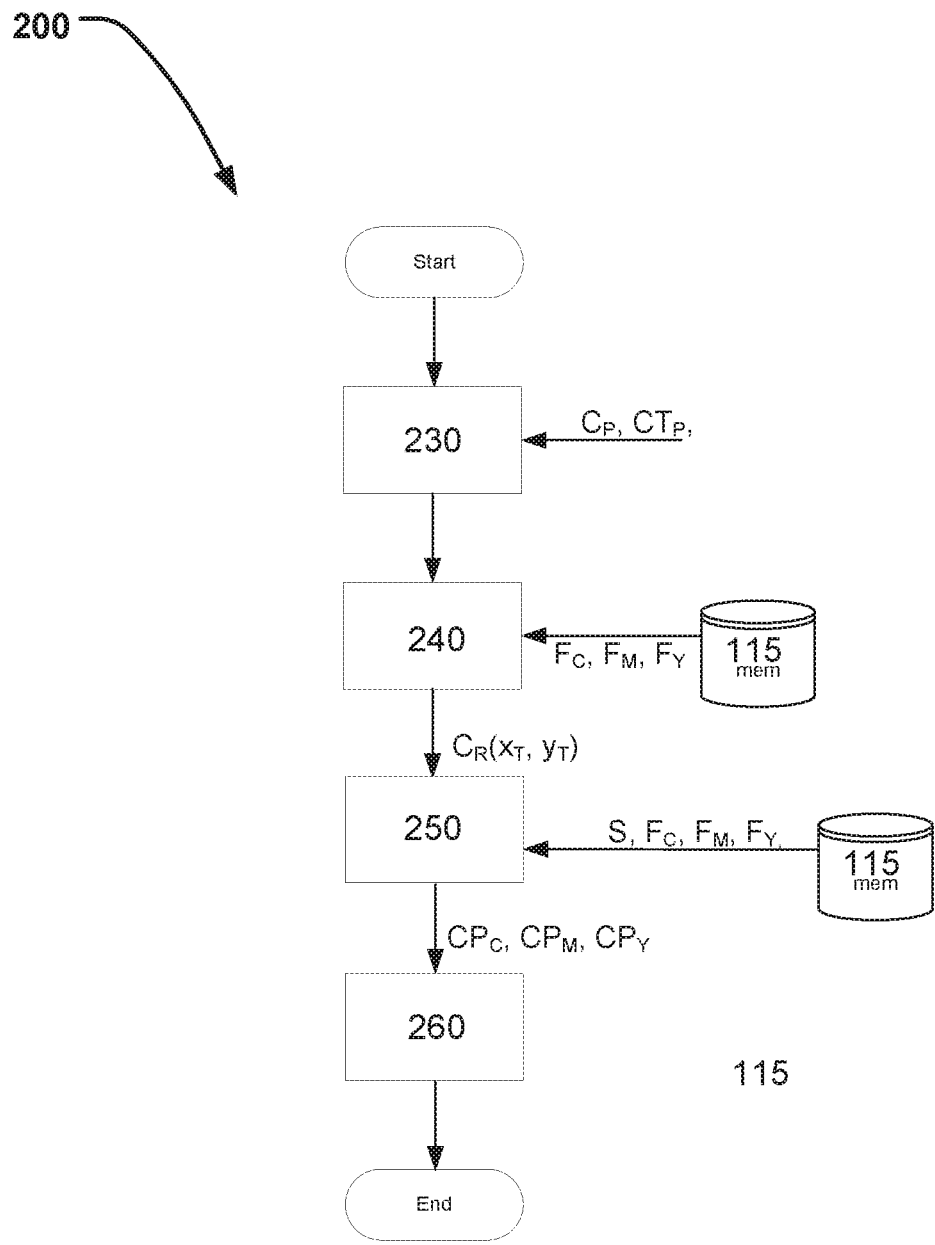
FIG. 2 illustrates a flow diagram of a method according to the present invention.

FIG. 2 illustrates a flow diagram of a method 200 of controlling a light fixture comprising at least one light source emitting light having a spectral characteristic, a first color filter, a second color filter and a third color filter, where each color filter has a predetermined spectral filter characteristic which gradually increases across said color filter and the color filters are independently movable and can be arranged in a number of different positions in relation to one another and in relation said light. Thus, the method can be used to control the light fixture illustrated in FIG. 1.

The method comprises a step 230 of receiving at least one color parameter $C_P$ and a color temperature parameter $CT_p$. The color parameter relates to the position of the color filters in relation to the light beam and can for instance indicate the percentage of saturation of the color provided by each color filter, the position of the color filters in relation to the light beam or a desired color in a color map. The color temperature parameter can for instance indicate a desired the color temperature of the light, a modification or the color temperature of the light, the percentage of saturation of a virtual temperature correction filter that may be inserted into the light beam or the position of a virtual color temperature correction filter. The virtual color temperature filter may simulate the effect of a real color temperature filter that can be inserted into the light, where the real color temperature filter is configured to adjust the color temperature of the emitted light upon inserting the real color temperature filter into the light beam. The color parameter and color temperature parameter can for instance be received via an input signal 117, from a memory or from a user interface at the light fixture.

The method comprises the step 240 of obtaining a resulting color $C_R$ of the light based on the color parameter $C_p$, the color temperature parameter $CT_p$, predetermined spectral filter characteristics of the color filters $F_C$, $F_M$, $F_Y$.

The resulting color $C_R$ can be provided as a coordinate $(x_T, y_T)$ in the CIE color space chromaticity diagram, and indicate the color of the light beam when the color filters, the virtual color temperature filter has been inserted into the light generated by the light source.

The predetermined characteristics of the color filters can be provided as a spectral scaling functions $F_C$, $F_M$, and $F_Y$, where $F_C$ is a spectrum scaling for a first color filter in a range from 0% to 100% for the frequencies of visual light. $F_M$ is a spectrum scaling for a second color filter in a range from 0% to 100% for the frequencies of visual light, and $F_Y$ is a spectrum scaling for a third color filter in a range from 0% to 100% for the frequencies of visual light. These values can be obtained through a calibration process and be stored in memory 115. It should be noticed that the predetermined spectral filter characteristics of the color filters can be stored in any format.

The method comprises step 250 of obtaining color filter position parameters $CP_C$, $CP_M$, $CP_Y$ based on the coordinates of the resulting color $C_R(x_T, y_T)$, the predetermined characteristics of the color filters $F_C$, $F_M$, and $F_Y$ and the spectral characteristic of the light emitted by said light source S. The predetermined spectral characteristics of the light source S characterizes the light emitted by the light source as a spectral distribution in a range from 0% to 100% for the frequencies of visual light. This spectrum can be obtained through a calibration process and be stored in memory 115. It is also noticed that the predetermined characteristics of the light source can be stored in any format.

The color filter position parameters $CP_C$, $CP_M$ and $CP_Y$ indicate the percentage values of the color filters that should be applied to create the resulting color $C_R$ of the light beam. $CP_C$ thus indicate a percentage between 0% and 100% indicative of the amount a first color filter is to be inserted into the source light beam. $CP_M$ indicates a percentage between 0% and 100% indicative of the amount a second color filter is to be inserted into the source light beam. $CP_Y$ indicates a percentage between 0% and 100% indicative of the amount a third color filter is to be inserted into the source light beam. In the illustrated example there are three different color filters, which can be moved inside the source light beam in order to apply the filtering effect between 0% to 100%. However, it should be understood that any number of color filters can be used as long as they cover at least a triangular gamut in a color space.

The method comprises the step 260 of moving the color filters into the source light beam based on the color filter position parameters. The positioning of the color filters in the source light beam can be performed using actuators configured to move the color filters inside the light.

Consequently, it is possible to emulate the presents of a color temperature correction filter in a light fixture comprising only regular color filters enabling the user to correct the color temperature of the light beam independently of correcting the color of the light beam. This is archived as the method of controlling the light fixture determines the positions of the color filters based on the color parameter relating to the position of the color filter without color temperature correction, the color temperature parameter, the filter characteristic of the color filters. Thus it is possible to provide a light fixture with a smaller amount of optical components as a physical color temperature filter can be omitted and it is thus possible to provide a more compact light fixture at a more attractive price. Additionally, it is possible to provide different color temperature corrections to the light beam without the need of exchanging a physical color temperature filter which can be achieved by linking different virtual color temperature correction filters to the received the color temperature parameter. For instance the color temperature parameter can provide a shift towards warmer light or a shift towards cooler light.

Figure 3A:
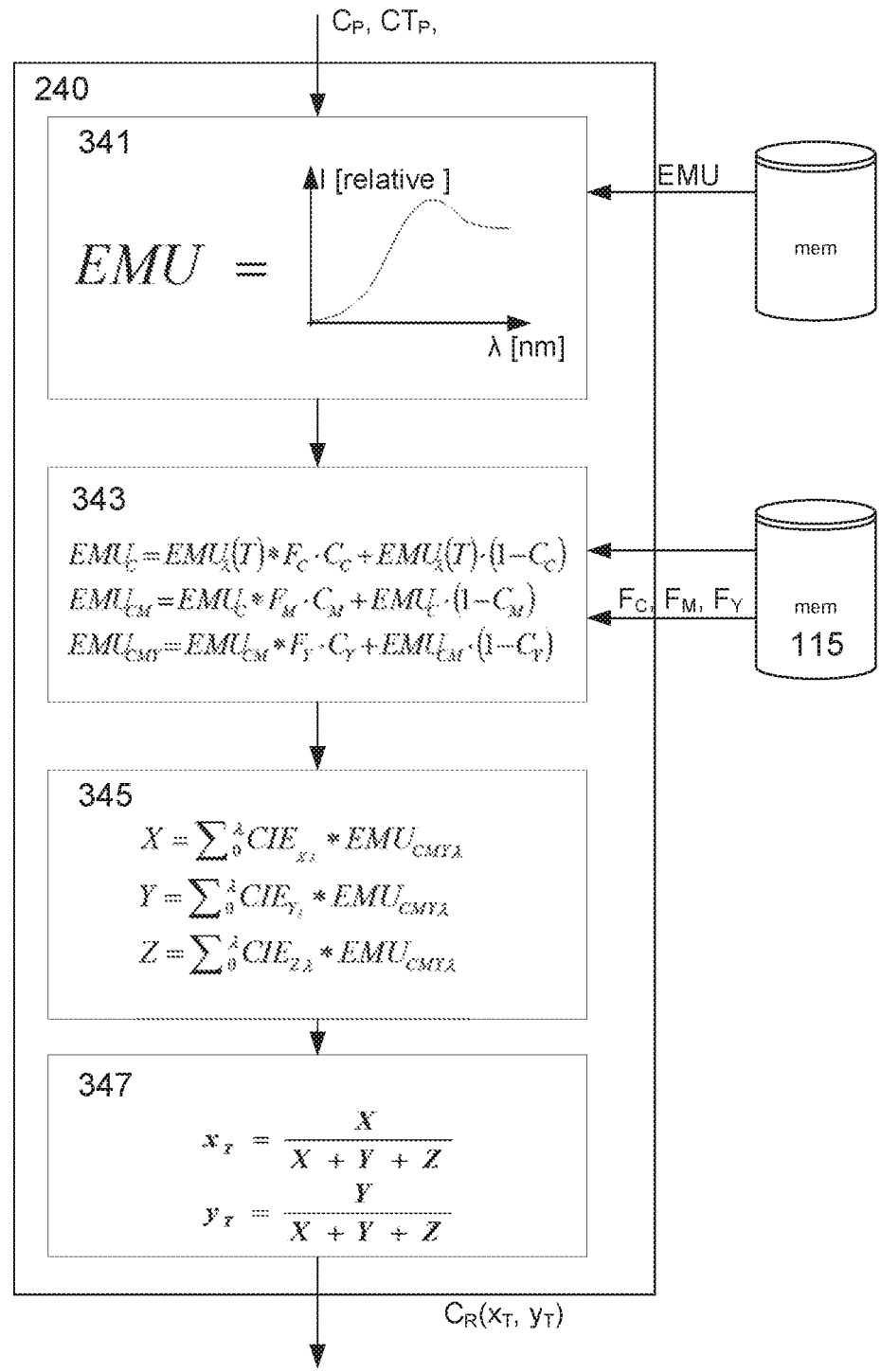
FIGS. 3a and 3b illustrate a flow diagram of a method of obtaining a resulting color as a coordinate in the CIE color space by emulating a light source having an emulated spectrum.

FIG. 3a illustrates one embodiment of step 240 of obtaining the resulting color $C_R(x_T, y_T)$ of light based on the color parameter $C_p$, the color temperature parameter CT and predetermined spectral filter characteristics of the color filters $F_C$, $F_M$, $F_Y$ and illustrates a flow diagram of step 240.

In this embodiment the coordinates $(x_T, y_T)$ of the resulting color in the CIE diagram is obtained by emulating a light source emitting emulated light having an emulated spectral characteristics. Step 341 is a step of emulating a light source by emulating a light source emitting emulated light having an emulated spectral characteristics.

Figure 7B:
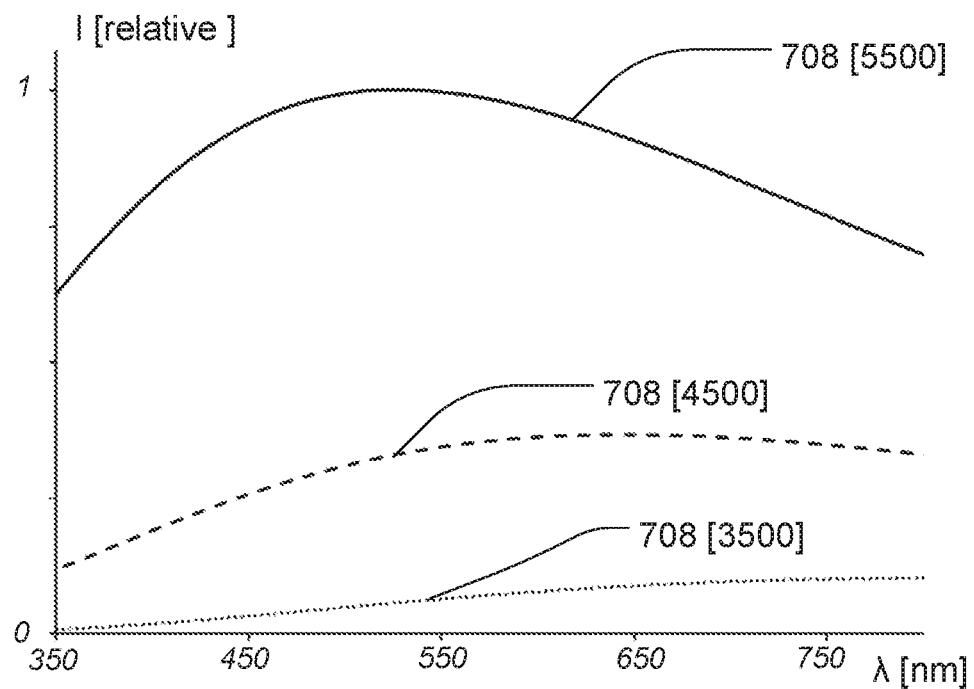
FIGS. 7a-7b illustrate examples of the spectrum of an emulated light source.
Figure 7A:
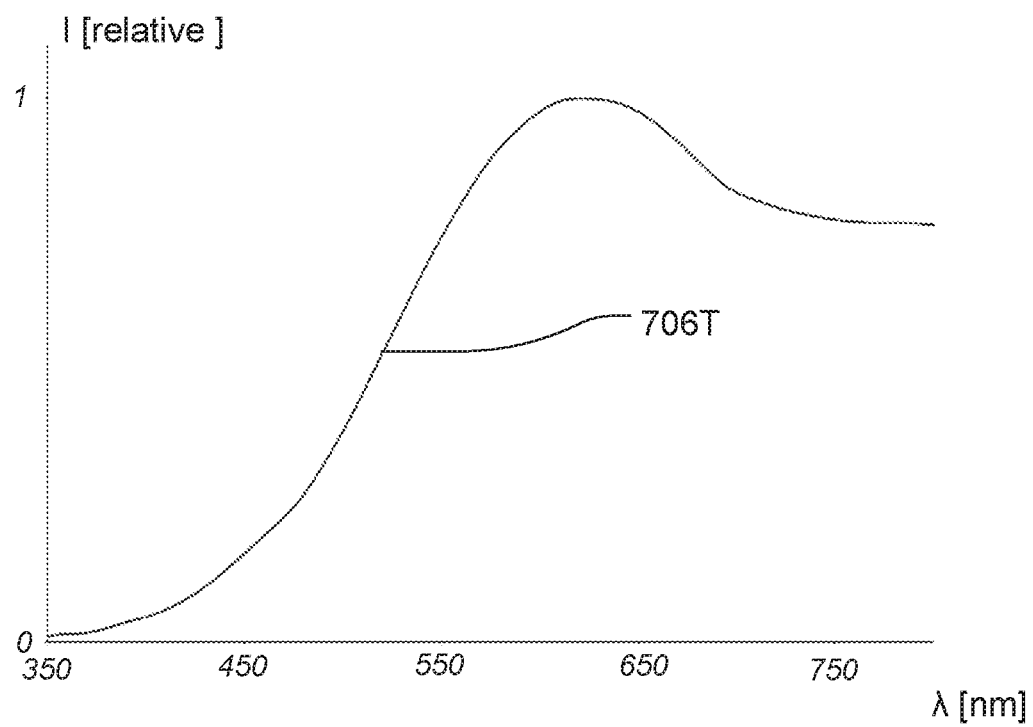

The emulated light source can emulate any kind of light source having any spectral characteristics and for instance be provided as a spectrum indicating the spectral distribution of the light emitted by the emulated light source. FIG. 7a illustrates the spectrum of a emulated light sources and illustrates the relative intensity I of the light emitted by the emulated light source 706T, as a function of wavelength λ in nm. In FIG. 7b the spectrum of the emulated light as illustrated corresponds to the spectrum of a tungsten based light source. The emulated spectral characteristics can thus be determined based on spectral characteristics of any kind of light source and be used when determining the resulting color resulting color $C_R(x_T, y_T)$. The emulated spectral characteristic can for instance be obtained based on the color temperature parameter which for instance can indicate which type of emulated spectral characteristics should be used to obtain the resulting color $C_R(x_T, y_T)$. This makes it possible to provide a large number of emulated light sources whereby the light fixture can emulate a large number of different type of light sources.

The at least one color parameter $C_P$ and the color temperature parameter $CT_p$ received in step 230 (show in FIG. 2) is provided as an input to step 240 and the resulting color $C_R$ is then obtained based on the color parameters $C_P$, characteristics of the emulated light and the predetermined spectral filter characteristics of the color filters.

In this embodiment the spectrum of the emulated light sources EMU has been predetermined and stored in the memory and in step 341 the spectrum is obtained from the memory.

Step 343 of the method generates a resulting spectrum based on the color parameter $C_p$, the predetermined spectral filter characteristics of the color filters $F_C$, $F_M$, and $F_Y$, the spectrum of the emulated light source obtained in step 341. This is achieved by applying the color filters to the emulated light according to the color parameter.

In step 343 the resulting spectrum is determined using a convolution technique where the effect of the color filters based on the color parameters to the emulated light is applied successively to the emulated light.

In this embodiment, the color parameter $C_P$ is a scaling matrix indicating the degree with which the color filters among different color filters are applied to the light.

$$C_P = \begin{bmatrix} C_C \\ C_M \\ C_Y \end{bmatrix} \quad \text{Equation 1}$$

where $C_C$ indicated the degree with which the first color filter is applied to the light; $C_M$ indicated the degree with which the second color filter is applied to the light and $C_Y$ indicated the degree with which the third color filter is applied to the light;

The effect of the first color filter on the emulated light is found using:

$$EMU_C = EMU * F_C \cdot C_C + EMU \cdot (1 - C_C) \quad \text{Equation 2}$$

where $EMU_C$ is a spectrum of emulated light reduced by the first color filter, EMU is the spectrum of the emulated light source in step 341, $F_C$ is the predetermined spectral filter characteristics of the first color filter and $C_C$ the degree with which the first color filter is applied to the light as described above.

Then the effect of the second color filter on the emulated light with the effect of the first color filter applied thereto is found by:

$$EMU_{CM} = EMU_C * F_M \cdot C_M + EMU_C \cdot (1 - C_M) \quad \text{Equation 3}$$

where $EMU_{CM}$ is a spectrum of emulated light reduced by the first color filter and the second color filter, $EMU_C$ is the spectrum of emulated light reduced by the first color filter found by Equation 2, $F_M$ is the predetermined spectral filter characteristics of the second color filter and $C_M$ degree of which the second color filter is applied to the light.

Thereafter the effect of the third color filter on the emulated light with the effect of the first color filter and second color filter applied thereto is found by:

$$EMU_{CMY} = EMU_{CM} * F_Y C_Y + EMU_{CM}(1-C_Y) \quad \text{Equation 4}$$

where $EMU_{CMY}$ is a spectrum of emulated light reduced by the first color filter, the second color filter and the third color filter, $EMU_{CM}$ is the spectrum of emulated light reduced by the first color filter and second color filter found by Equation 3, $F_Y$ is the predetermined spectral filter characteristics of the third color filter and $C_Y$ degree of which the third color filter is applied to the light.

It is noted that the order of convolution of the spectrum of the various color filters with the spectrum of the emulated light can be performed in any order.

The spectrum of the emulated light with the color filters $F_C$; $F_M$; $F_Y$ applied thereto at the corresponding amount indicated by $C_C$, $C_M$, $C_Y$ is then in step 345 used to obtain the X, Y, and Z tristimulus values of the emulated light with the color filter applied thereto using CIE color matching functions.

The X-tristimulus value of the resulting light can be found as the sum of X-tristimulus value of each wavelength of the CIE color matching functions multiplied with the value of each wavelength from the spectrum of the emulated light with the color filter applied thereto:

$$X = \Sigma_0^{\lambda} CIE_{X_\lambda} \cdot EMU_{CMY_\lambda} \quad \text{Equation 5}$$

where; X is the X-tristimulus value, $\lambda$ is the wavelength in nanometers and $EMU_{CMY}$ is the spectrum of the spectrum of the emulated light with the color filter applied there to and found in Equation 4.

The resulting Y-tristimulus value of the emulated light with the color filter applied thereto can be found as the sum of Y-tristimulus value of each wavelength of the CIE color matching functions multiplied with the value of each wavelength from the spectrum of the emulated light with the color filter applied thereto $$Y = \Sigma_0^{\lambda} CIE_{Y_\lambda} \cdot EMU_{CMY_\lambda} \quad \text{Equation 6}$$

where Y is the Y-tristimulus value, $\lambda$ is the wavelength in nanometers and $EMU_{CMY}$ is the spectrum of the emulated light with the color filters applied thereto.

The resulting Z-tristimulus value of the emulated light with the color filter applied thereto can be found as the sum of Y-tristimulus value of each wavelength of the CIE color matching functions multiplied with the value of each wavelength from the spectrum of the emulated light with the color filter applied thereto.

$$Z = \Sigma_0^{\lambda} CIE_{Z_\lambda} \cdot EMU_{CMY_\lambda} \quad \text{Equation 7}$$

where Z is the Z-tristimulus value; $\lambda$ is the wavelength in nanometers and $EMU_{CMY}$ is the spectrum of the emulated light with the color filters applied thereto.

In step 347 the X, Y, Z tristimulus values is used to obtain the coordinate of the resulting color $C_R(x_T, y_T)$ in the CIE color space, where the resulting color is the color of the emulated light with the color filters applied thereto.

The parameters $x_T$ and $y_T$ can be determined using the following:

$$x_T = \frac{X}{X+Y+Z} \quad \text{Equation 8}$$

$$y_T = \frac{Y}{X+Y+Z} \quad \text{Equation 9}$$

where $x_T$ is the x-coordinate in a CIE color space chromaticity diagram, $y_T$ is the y-coordinate in a CIE color space chromaticity diagram, X is the X-tristimulus value as mentioned obtained by Equation 5 in step 345; Y is the Y-tristimulus value obtained by Equation 6 in step 345 and Z is the Z-tristimulus value obtained by Equation 7 in step 345.

Figure 3B:
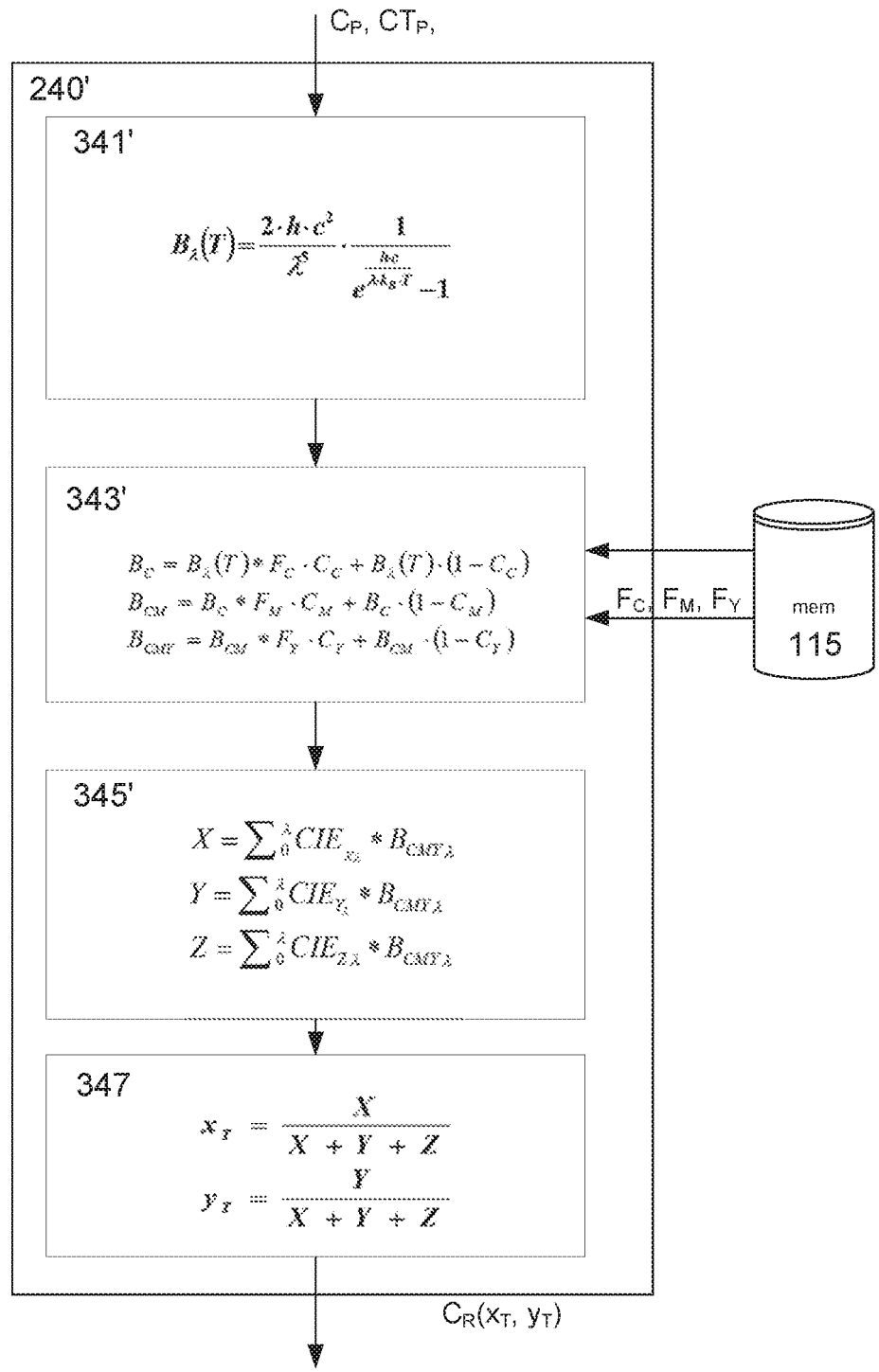

FIG. 3b illustrates another embodiment of step 240' of obtaining the resulting color $C_R(x_T, y_T)$ of light based on the color parameter $C_p$, the color temperature parameter CT and predetermined spectral filter characteristics of the color filters $F_C$, $F_M$, $F_Y$ and illustrates a flow diagram of step 240. In this embodiment the Step 341' of emulating a light source comprises a step of emulating a light source having a black-body radiation at a color temperature indicated by the color temperature parameter $CT_P$. The black-body radiation of the emulated light source can be obtained with by:

$$B_\lambda(T) = \frac{2 \cdot h \cdot c^2}{\lambda^5} \cdot \frac{1}{e^{\frac{hc}{\lambda k_B T}} - 1} \quad \text{Equation 10}$$

where h is Planck's constant ($6.626070040 \cdot 10^{-34}$ J·s), $k_B$ is Boltzmann's constant ($1.38064852 \cdot 10^{-23}$ J/K), c is the speed of light in vacuum (299792458 m/s), $\lambda$ is the wave length in meters, and T is the color temperature in kelvin. The color temperature parameter $CT_P$ is provided as the input T.

FIG. 7b illustrates the spectrum of an emulated light sources where the emulated light are provided as black-body radiation at having a color temperature. The graphs illustrate the relative intensity I of the black body radiation at various color temperature as a function of wavelength $\lambda$ in nm. Dotted line 708 [3500] corresponds to a color temperature of 3500 Kelvin, dashed line 708 [4500] corresponds to a color temperature of 4500 Kelvin and solid line 708 [5500] corresponds to a color temperature of 5500 Kelvin.

Step 343' of the method generates a resulting spectrum based on the color parameter $C_p$, the predetermined spectral filter characteristics of the color filters $F_C$, $F_M$, and $F_Y$, the spectrum of the emulated light source obtained in step 341'. This is achieved by applying the color filters to the emulated light according to the color parameter.

In step 343' the resulting spectrum is determined using a convolution technique where the effect of the color filters based on the color parameters to the emulated light is applied successively to the emulated light.

In this embodiment, the color parameter $C_p$ is a scaling matrix indicating the degree with which the color filters among different color filters are applied to the light.

$$C_P = \begin{bmatrix} C_C \\ C_M \\ C_Y \end{bmatrix} \quad \text{Equation 11}$$

where $C_C$ indicates the degree with which the first color filter is applied to the light; $C_M$ indicated the degree with which the second color filter is applied to the light and $C_Y$ indicated the degree with which the third color filter is applied to the light;

The effect of the first color filter on the emulated light is found using:

$$B_C = B_\lambda(T) * F_C \cdot C_C + B_\lambda(T) \cdot (1-C_C) \qquad \text{Equation 12}$$

where $B_C$ is a spectrum of emulated light reduced by the first color filter, $B_\lambda(T)$ is the black body radiation of the emulated light source obtained in step 341', $F_C$ is the predetermined spectral filter characteristics of the first color filters and $C_C$ the degree with which the first color filter is applied to the light as described above.

Then the effect of the second color filter on the emulated light with the effect of the first color filter applied thereto is found by:

$$B_{CM} = B_C * F_M \cdot C_M + B_C (1-C_M) \qquad \text{Equation 13}$$

where $B_{CM}$ is a spectrum of emulated light reduced by the first color filter and the second color filter, $S_C$ is the spectrum of emulated light reduced by the first color filters found by Equation 12, $F_M$ is the predetermined spectral filter characteristics of the second color filters and $C_M$ degree with which the second color filter is applied to the light.

Thereafter the effect of the third color filter on the emulated light with the effect of the first color filter and second color filter applied thereto is found by:

$$B_{CMY} = B_{CM} * F_Y \cdot C_Y + B_{CM}(1-C_Y) \qquad \text{Equation 14}$$

where $B_{CMY}$ is a spectrum of emulated light reduced by the first color filter, the second color filter and the third color filter, $S_{CM}$ is the spectrum of emulated light reduced by the first color filter and second color filter found by Equation 13, $F_Y$ is the predetermined spectral filter characteristics of the third color filters and $C_Y$ degree with which the third color filter is applied to the light.

It is noted that the order of convolution of the spectrum of the various color filters with the spectrum of the emulated light can be performed in any order.

The spectrum of the emulated light having a black body radiation at the color temperature provided by the color temperature parameter $CT_p$ with the color filters $F_C$; $F_M$; $F_Y$ applied thereto at respectively amount indicated by $C_C$, $C_M$, $C_Y$ is then in step 345' used to obtain the X, Y, and Z tristimulus values of the emulated light with the color filter applied thereto using CIE color matching functions.

The X-tristimulus value of the resulting light can be found as the sum of X-tristimulus value of each wavelength of the CIE color matching functions multiplied with the value of each wavelength from the spectrum of the emulated light with the color filter applied thereto:

$$X = \Sigma_0^\lambda CIE_{X\lambda} \cdot B_{CMY\lambda} \qquad \text{Equation 15}$$

where; X is the X-tristimulus value, $\lambda$ is the wavelength in nanometers and $B_{CMY}$ is the spectrum of the spectrum of the emulated light with the color filter applied there to and found in Equation 14.

The resulting Y-tristimulus value of the emulated light with the color filter applied thereto can be found as the sum of Y-tristimulus value of each wavelength of the CIE color matching functions multiplied with the value of each wavelength from the spectrum of the emulated light with the color filter applied thereto $$Y = \Sigma_0^\lambda CIE_{Y\lambda} \cdot B_{CMY\lambda} \qquad \text{Equation 16}$$

where Y is the Y-tristimulus value, $\lambda$ is the wavelength in nanometers and $B_{CMY}$ is the spectrum of the emulated light with the color filter applied thereto.

The resulting Z-tristimulus value of the emulated light with the color filter applied thereto can be found as the sum of Y-tristimulus value of each wavelength of the CIE color matching functions multiplied with the value of each wavelength from the spectrum of the emulated light with the color filter applied thereto.

$$Z = \Sigma_0^\lambda CIE_{Z\lambda} \cdot S_{CMY\lambda} \qquad \text{Equation 17}$$

where Z is the Z-tristimulus value; $\lambda$ is the wavelength in nanometers and $B_{CMY}$ is the spectrum of the emulated light with the color filter applied thereto.

In step 347 the X, Y, Z tristimulus values is used to obtain the coordinate of the resulting color $C_R(x_T, y_T)$ using Equation 8 and Equation 9 as described previously using the X-tristimulus value obtained by Equation 15 in step 345'; the Y-tristimulus value obtained by Equation 16 in step 345' and the Z-tristimulus value obtained by Equation 17 in step 345'.

Steps 345' and 347' provide the resulting color of the emulated light with the color filter applied thereto as a coordinate in the CIE color space however it is noticed that it is also possible to describe the color of the resulting color using any other color spaces like such as RGB, CMYK, YIQ, YUV, HSV (hue, saturation, value), HSL (hue, saturation, lightness/luminance).

Figure 4:
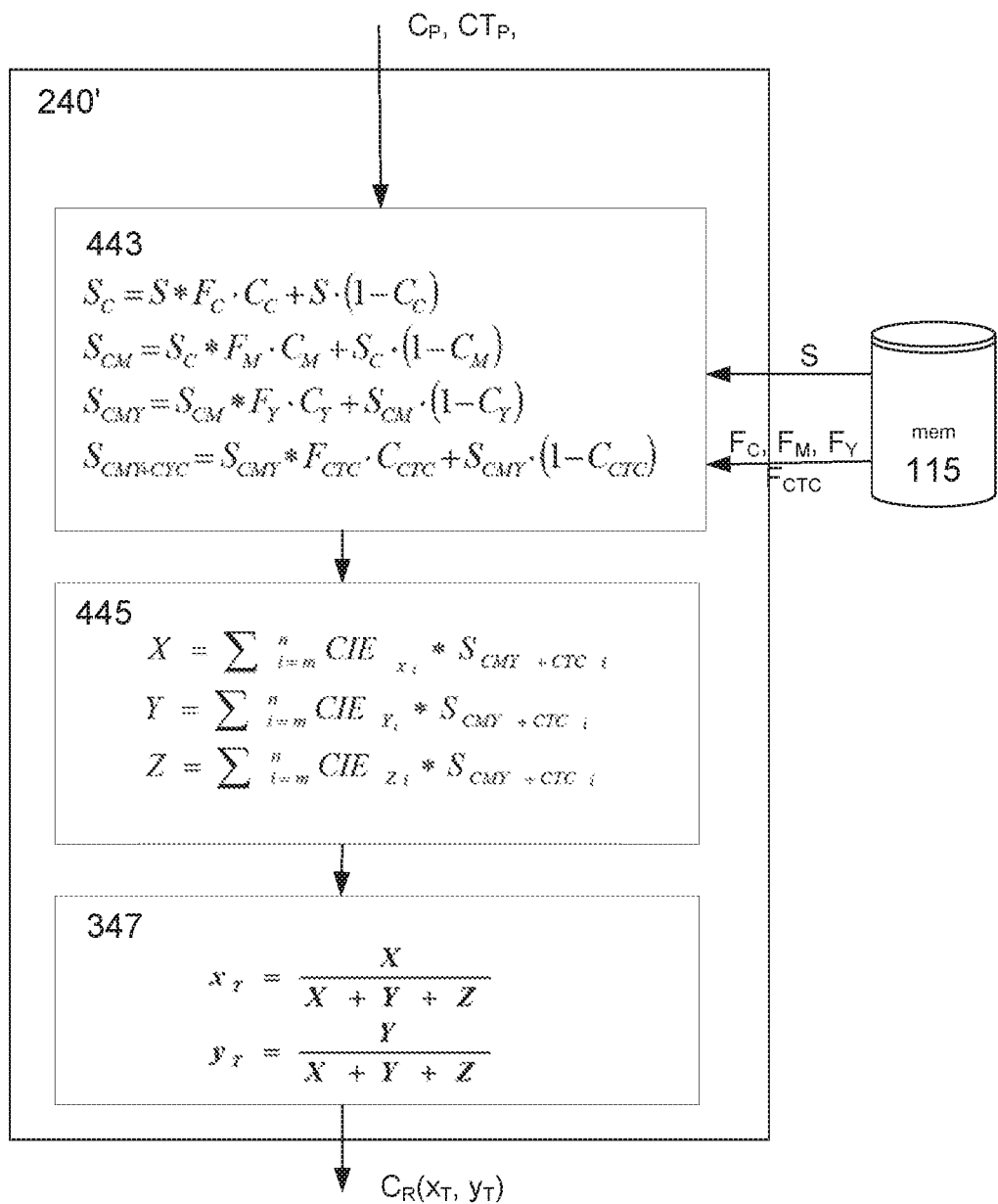
FIG. 4 illustrates a flow diagram of another method of obtaining a resulting color as a coordinate in the CIE color space by obtaining the effect of applying color filters to the light according to color parameters and applying a color correction filter to the light according to a color temperature correction parameters to light.

FIG. 4 illustrates another embodiment of step 240' of obtaining the resulting color $C_R(x_T, y_T)$ of light based on the color parameter $C_p$, the color temperature parameter $CT_p$ and predetermined spectral filter characteristics of the color filters $F_C$, $F_M$, $F_Y$ and illustrates a flow diagram of step 240'.

Figure 8:
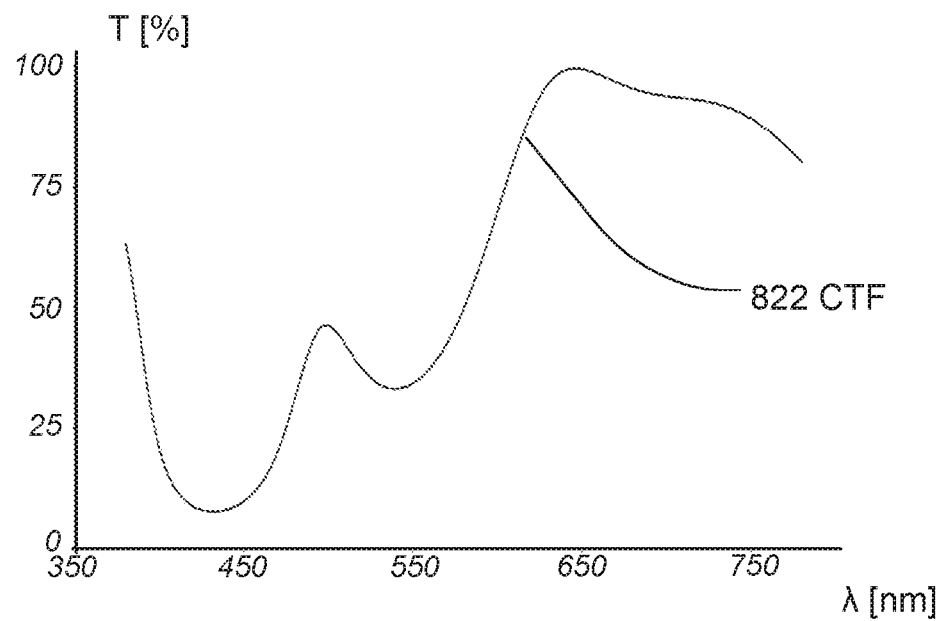
FIG. 8 illustrates an example of an emulated color temperature correction filter.

In this embodiment the resulting color $C_R(x_T, y_T)$ is further obtained based on predetermined spectral characteristics of the actual light source, S and spectral filter characteristics $F_{CTC}$ of an emulated color temperature correction filter (CTF filter). Where the spectral filter characteristics of the emulated color temperature correction filter filters can be providing as a spectral scaling functions $F_{CTC}$ in a range from 0% to 100% for the frequencies of visual light. r. The spectral characteristic of a CTF filter 822 CTF is illustrated in FIG. 8 and illustrates the percentage transmission T of light through the CTF filter, when the filter is fully applied to the light, as a function of wavelength $\lambda$ in nm. The illustrated CTF filter is configured to reduce the color temperature of the light source illustrated in FIG. 9 from approximately 5800 Kelvin to 2700 Kelvin when fully inserted into the light. It is to be understood that the illustrated filter characteristic of the CTF filter illustrates one example of a filter and that many different filter properties can be provided.

In this embodiment the color parameter $C_p$ is a scaling matrix indicating the degree with which the color filters among different color filters are applied to the light as provided by Equation 11 and the color temperature parameter $CT_p$ indicates the degree with which the emulated color temperature correction filter is applied to the light.

The color parameter $C_p$ and the color temperature parameter $CT_p$ are received in step 230 (show in FIG. 2) and provided as an input to step 240'.

Step 435 is a step of obtaining the spectrum of the resulting light occurring by applying the color filters, the emulated color temperature correction filter to the light emitted by the light source. This is achieved by using a convolution technique where the effect of the color filters based on the color parameter and the effect of the emulated color temperature correction filter based on the color temperature parameter to the emitted light is applied successively to the spectrum of the emitted light.

The effect of the first color filter on the emitted light is found using Equation 18, the effect of the second color filter is then in Equation 19 applied to the resulting spectrum found in Equation 18; the effect of the third color filter is then in Equation 20 applied to the resulting spectrum found in Equation 19 and the effect of the emulated color temperature correction filter is then in Equation 21 applied to the resulting spectrum found in Equation 20.

$$S_C = S^* F_C \cdot C_C + S \cdot (1 - C_C) \quad \text{Equation 18}$$

$$S_{CM} = S_C^* F_M \cdot C_M + S_C \cdot (1 - C_M) \quad \text{Equation 19}$$

$$S_{CMY} = S_{CM}^* F_Y \cdot C_Y + S_{CM} \cdot (1 - C_Y) \quad \text{Equation 20}$$

$$S_{CMY+CTC} = S_{CMY}^* F_{CTC} \cdot C_{CTC} + S_{CMY} \cdot (1 - C_{CTC}) \quad \text{Equation 21}$$

where S is the spectrum of the emitted light, $S_C$ is the spectrum of emitted light reduced by the first color filters, $S_{CM}$ is the spectrum of emitted light reduced by the first color filter and the second color filter, $S_{CMY}$ is the spectrum of emitted light reduced by the first color filter, the second color filter and the third color filter; $S_{CMY+CTC}$ is the spectrum of emulated light reduced by the first color filter, the second color filter, the third color filter and the emulated color temperature correction filter, $F_C$, $F_M$ and $F_Y$ is the predetermined spectral filter characteristics of respectively the first, second and third color filters and $F_{CTC}$ is the spectral filter characteristics of the emulated color temperature correction filter.

It is noted that the order of convolution of the spectrum of the various color filters and the spectrum of the emulated color correction filter with the spectrum of the emulated light can be performed in any order.

The X-, Y-, and Z-tristimulus values of the emitted light with the color filters and color temperature correction filter thereto is then in step 445 obtained by using CIE color matching functions as described previously in connection with step 345. The X-, Y-; Z-tristimulus values are thus respectively obtained using Equation 22, Equation 23 and Equation 24:

$$X = \Sigma_{i=m}^{n} CIE_{X_i} \cdot S_{cCMY+CTC_i} \quad \text{Equation 22}$$

$$Y = \Sigma_{i=m}^{n} CIE_{Y_i} \cdot S_{CMY+CTC_i} \quad \text{Equation 23}$$

$$Z = \Sigma_{i=m}^{n} CIE_{Z_i} \cdot S_{CMY+CTC_i} \quad \text{Equation 24}$$

where X, Y and Z are respectively the X-, Y-, Z-tristimulus value of the emitted light after as it would appear after having passed through the color filters and the emulated color correction filter; m is the lower wavelength of visible light, n is the upper wavelength of visible light, and $S_{CMY+CTC}$ is the spectrum of the emitted light source it has passed through the color filters and the emulated color correction filter.

As described previously in connection with step 347 the parameters $x_T$ and $y_T$ of the resulting color can be determined using Equation 8 and Equation 9 where, X is the X-tristimulus value as mentioned obtained by Equation 22 in step 445; Y is the Y-tristimulus value obtained by Equation 23 in step 445 and Z is the Z-tristimulus value obtained by Equation 24 in step 445.

Figure 5:
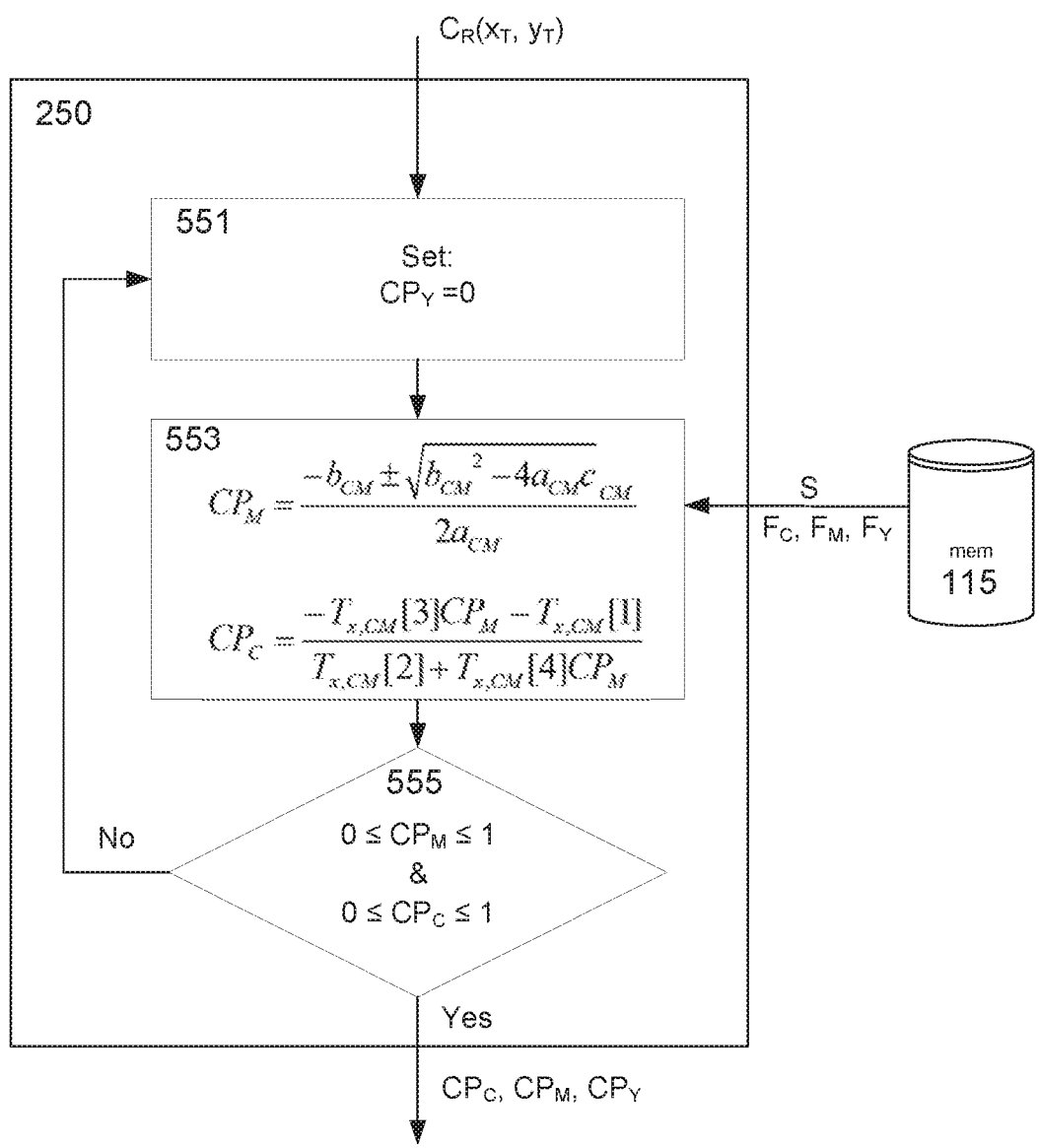
FIG. 5 illustrates a flow diagram of a method of obtaining the color filter position parameters based on the coordinates of a resulting in a CIE color space, predetermined characteristics of the color filters and the spectral characteristic of the light.

FIG. 5 illustrates an embodiment of step 250 of obtaining color filter position parameters indicating the position of the color filters in relation to the light based on the resulting color, the predetermined characteristics of the color filters and the spectral characteristic of the light emitted by the light source.

In this embodiment the color filter position parameters $CP_C$, $CP_M$, $CP_Y$ respectively relating to the position of the first, the second and the third color filter is obtained. The color filter position parameters are defined by $CP_C$, $CP_M$ and $CP_Y$ indicating the amount with which the first color filter, the second color filter and the third color filter is to be applied to the light in order to provide a light beam having the color and color temperature indicated by the color parameters $C_p$ and $CT_p$. For instance, $CP_C$ can indicate a percentage value in range 0% to 100% defining to what extend the first color filter shall be applied to the light; $CP_M$ can indicate a percentage value in range 0% to 100% defining to what extend the second color filter shall be applied to the light and $CP_Y$ can indicate a percentage value in range 0% to 100% defining to what extend the third color filter shall be applied to the light.

Step 250 can be elaborated into a series of steps starting with the step 551 of setting at least one of the color filter position parameters $CP_C$, $CP_M$, or $CP_Y$ to zero, where zero indicates that the corresponding color filter is not applied to the light. E.g. by indicating that the color filter is to be positioned outside the light.

In the following the third color filter position parameter $CP_Y$ is set to zero, however it is to be understood that any of the color filter position parameters can be chosen as the color filter position parameter that is set to zero. It should also be noticed that the color filter position parameters which is set to zero also can be chosen based on the received color parameters C, the received color temperature parameter $CT_P$ and/or the resulting color $C_R$ for instance as indicated by X-, Y-, and Z-tristimulus values of the resulting color $C_R$ or the coordinate of the resulting color $C_R(x_T, y_T)$ in the CIE color space.

Since the CIE color space chromaticity diagram is two-dimensional only two color filters are needed in order to adjust the color and color temperature of the light, this means that the controller can determine which two color filters is needed to obtain the resulting color $C_R$.

The color filter position parameters of the other two filter position parameters are obtained in step 553, thus the filter position parameters, which have not been set to zero, are obtained. In this example this are the color filter position parameters $CP_C$ and $CP_M$ relating respectively to the first and second color filters.

The effects of the two color filters, with a color filter position parameter greater than 0, $CP_C$ and $CP_M$, on the light source is determined:

$$SP_C = S^*(CP_C(F_C - 1) + 1) \quad \text{Equation 25:}$$

$$SP_{CM} = SP_C^*(CP_M(F_M - 1) + 1) \quad \text{Equation 26:}$$

where S is the predetermined characteristics of the light source, $SP_C$ is the characteristics of the light reduced by the first color filter applied according the first color filter position parameter $CP_C$, $F_C$ is the predetermined characteristics of the first color filter; $SP_{CM}$ is the characteristics of the light reduced by the first color filter applied according to the first color filter position parameter $CP_C$ and by the second color filter applied according to the second color filter position parameter $CP_M$, $F_M$ is the predetermined characteristics of the second color filter.

Equation 25 and Equation 26 are then combined:

$$SP_{CM} = S^*(1 + CP_C(F_C - 1) + CP_M(F_M - 1) + CP_C CP_M(F_C - 1)(F_M - 1)) \quad \text{Equation 27:}$$

Setting up two vectors comprising the known and the unknown variables of Equation $$P_{CM} = [1 \quad F_C-1 \quad F_M-1 \quad (F_C-1)(F_M-1)] \quad \text{Equation 28}$$

$$V_{CM} = \begin{bmatrix} 1 \\ CP_C \\ CP_M \\ CP_C CP_M \end{bmatrix} \quad \text{Equation 29}$$

where $P_{CM}$ comprises the known variables of Equation 27 and V comprises the unknown variables of Equation 27. With these vectors Equation 27 can be written as:

$$SP_{CM} = S \cdot P_{CM} \cdot V_{CM} \quad \text{Equation 30:}$$

The X-, Y-, and Z-tristimulus values of the light $SP_{CM}$ reduced by the first color filter applied according the first color filter position parameter $CP_C$ and by the second color filter applied according the second color filter position parameter $CP_M$, can be found by:

$$X = \Sigma_{i=m}{}^n CIE_{X_i} \cdot SP_{CM_i} \quad \text{Equation 31:}$$

$$Y = \Sigma_{i=m}{}^n CIE_{Y_i} \cdot SP_{CM_i} \quad \text{Equation 32:}$$

$$Z = \Sigma_{i=m}{}^n CIE_{Z_i} \cdot SP_{CM_i} \quad \text{Equation 33:}$$

where X, Y and Z are respectively the X-, Y-, Z-tristimulus value of the emitted light after; m is the lower wavelength of visible light, n is the upper wavelength of visible light.

Inserting Equation 30 into Equation 31, Equation 32 and Equation 33 considering the fact that V only contains 1, $CP_C$, $CP_M$, $CP_C CP_M$ which are all constants results in:

$$X = \Sigma_{i=m}{}^n (CIE_{X_i} * S_i * P_{CM_i}) V \quad \text{Equation 34:}$$

$$Y = \Sigma_{i=m}{}^n (CIE_{Y_i} * S_i * P_{CM_i}) V \quad \text{Equation 34:}$$

$$Z = \Sigma_{i=m}{}^n (CIE_{Z_i} * S_i * P_{CM_i}) V \quad \text{Equation 34:}$$

In order to simplify the following calculations, the values $X_{CM}$, $Y_{CM}$, and $Z_{CM}$ are defined as the combined spectrums for the X-, Y-, and Z-tristimulus values provided by the first and second color filter.

$$X_{CM} = \Sigma_{i=m}{}^n (CIE_{X_i} * S_i * P_{CM_i}) \quad \text{Equation 37:}$$

$$Y_{CM} = \Sigma_{i=m}{}^n (CIE_{Y_i} * S_i * P_{CM_i}) \quad \text{Equation 37:}$$

$$X_{CM} = \Sigma_{i=m}{}^n (CIE_{Z_i} * S_i * P_{CM_i}) \quad \text{Equation 37:}$$

Utilizing the correlation between a color coordinate in the CIE color space and the tristimulus values as known in the art:

$$0 = x(X+Y+Z)-X \quad \text{Equation 40:}$$

$$0 = y(X+Y+Z)-Y \quad \text{Equation 41:}$$

where x is the x-coordinate in a CIE color space chromaticity diagram, y is the y-coordinate in a CIE color space chromaticity diagram, X is the X-tristimulus value of the light; Y is the Y-tristimulus of the light and Z is the Z-tristimulus value of the light.

The x and y coordinates in a CIE color space chromaticity diagram of the resulting color $C_R(x_T, y_T)$ have previous be obtained and by substituting into Equation 34 to Equation 39 into Equation 40 and Equation 41:

$$0 = x_T(X_{CM}V_{CM} + Y_{CM}V_{CM} + Z_{CM}V_{CM}) - X_{CM}V_{CM} \quad \text{Equation 42:}$$

$$0 = y_T(X_{CM}V_{CM} + Y_{CM}V_{CM} + Z_{CM}V_{CM}) - Y_{CM}V_{CM} \quad \text{Equation 43:}$$

Since V is in every term constant it can be isolated:

$$0 = (x_T(X_{CM} + Y_{CM} + Z_{CM}) - X_{CM})V_{CM} \quad \text{Equation 44:}$$

$$0 = (y_T(X_{CM} + Y_{CM} + Z_{CM}) - Y_{CM})V_{CM} \quad \text{Equation 45:}$$

To simplify the following calculations, $T_{x,CM}$, and $T_{y,CM}$ is used to describe the effect of the predetermined characteristics of the light source combined with the predetermined characteristics of the first and second color filters where:

$$T_{x,CM} = [x_T X_{CM} x_T Y_{CM} x_T Z_{CM} - X_{CM}] \quad \text{Equation 46:}$$

$$T_{y,CM} = [y_T X_{CM} y_T Y_{CM} y_T Z_{CM} - Y_{CM}] \quad \text{Equation 47:}$$

Thus Equation 44 and Equation 45 can be written as:

$$0 = V_{CM} T_{x,CM} \quad \text{Equation 48:}$$

$$0 = V_{CM} T_{y,CM} \quad \text{Equation 49:}$$

or as:

$$0 = T_{x,CM}[1] + CP_C T_{x,CM}[2] + CP_M T_{x,CM}[3] + CP_C CP_M T_{x,CM}[4] \quad \text{Equation 50:}$$

$$0 = T_{y,CM}[1] + CP_C T_{y,CM}[2] + CP_M T_{y,CM}[3] + CP_C CP_M T_{y,CM}[4] \quad \text{Equation 51:}$$

where $T_{x,CM}[n]$ is the $n^{th}$ position in the n×1 matrix $T_{x,CM}$, and $T_{y,CM}[n]$ is the $n^{th}$ position in the n×1 matrix $T_{y,CM}$, $T_n[1]$ represents the light source without any color filters, $T_n[2]$ represents the light source with the influence of the first color filter based on the color filter position parameter $CP_C$, $T_n[3]$ represents the light source with the influence of the second color filter based on the color filter position parameter $CP_M$, and $T_n[4]$ represents the light source with the combined influence of the first and the second color filter based on the color filter position parameters $CP_C$ and $CP_M$.

Combining Equation 50 and Equation 51 to eliminate $CP_C$ yields:

$$0 = CP_M^2 (T_{x,CM}[3]T_{y,CM}[4] - T_{x,CM}[4]T_{x,CM}[3]) + CP_M (T_{x,CM}[3]T_{x,CM}[2] + T_{x,CM}[1]T_{y,CM}[4] - T_{x,CM}[2] T_{x,CM}[3] - T_{x,CM}[4]T_{y,CM}[1]) + T_{x,CM}[1]T_{y,CM}[2] - T_{x,CM}[2]T_{y,CM}[1] \quad \text{Equation 52:}$$

Where $CP_M$ can be solved for as a quadric equation where a, b, and c is defined as:

$$a_{CM} = T_{x,CM}[3]T_{y,CM}[4] - T_{x,CM}[4]T_{x,CM}[3] \quad \text{Equation 53:}$$

$$b_{CM} = T_{x,CM}[3]T_{x,CM}[2] + T_{x,CM}[1]T_{y,CM}[4] - T_{x,CM}[2] T_{x,CM}[3] - T_{x,CM}[4]T_{y,CM}[1] \quad \text{Equation 54:}$$

$$c_{CM} = T_{x,CM}[1]T_{y,CM}[2] - T_{x,CM}[2]T_{y,CM}[1] \quad \text{Equation 55:}$$

Using Equation 53, Equation 54, Equation 55 $CP_M$ can be found:

$$CP_M = \frac{-b_{CM} \pm \sqrt{b_{CM}^2 - 4a_{CM}c_{CM}}}{2a_{CM}} \quad \text{Equation 56}$$

and $CP_C$ can then be found using:

$$CP_C = \frac{-T_{x,CM}[3]CP_M - T_{x,CM}[1]}{T_{x,CM}[2] + T_{x,CM}[4]CP_M} \quad \text{Equation 57}$$

Equation 56 provides two solutions for $CP_M$ and consequently two solutions for the pair of filter position parameter $CP_M$ and $CP_C$ fulfills the equations.

The color position parameter $CP_C$ indicates a percentage value in range 0% to 100% defining to what extend the first color filter shall be applied to the light and $CP_M$ indicates a percentage value in range 0% e to 100% defining to what extend the second color filter shall be applied to the light. Thus, the values of $CP_C$ and $CP_M$ must both be between 0 and 1 in order provide a solution where the resulting color can be provided using the first and second color filter.

The step 250 of obtaining the color filter position parameters $CP_C$, $CP_M$, $CP_Y$ relating to the position of the first, second and third color filter based on the coordinates of the resulting color $C_R(x_T, y_T)$ comprises thus a step of determining if the obtained filter position parameters, which have not been set to zero, are physical achievable.

This is done in step 555 where it is determined if both $CP_M$ and $CP_C$ indicate valid color filter position parameters. That is a position that is physically achievable and as fulfills:

$$0 \leq CP_M \leq 1 \quad \text{Equation 58:}$$

$$0 \leq CP_C \leq 1 \quad \text{Equation 59:}$$

If the obtained filter color filter position parameters, which have not been set to zero previously, $CP_M$ and $CP_C$, are physical achievable, then method proceed to a step of arranging the color filters in relation to one another and in relation to the light based on the color filter position parameters. Thus if both Equation 58 and Equation 59 are fulfilled for the pair of color position parameters, $CP_M$ and $CP_C$, then the color filters will be applied to the light in step 260.

Otherwise, in case that at least one of the obtained filter position parameters, which previously have not been set to zero, is not physical achievable. Then the step of setting one of said first, second or third filter position parameter to zero is repeated by setting a different filter position parameter to zero and the step of obtaining the other two filter position parameters is repeated using a different pair of other filter position parameters.

Thus step 551 is executed again by setting a different color filter position parameter to zero, for instance by setting $CP_M$ to zero and then in step 553 determining color the filter position parameters $CP_C$ and $CP_Y$ using similar equations as described previously. Alternatively $CP_C$ can be set to zero and the color filter position parameters $CP_M$ and $CP_Y$ can then be obtained in step 553.

As an example in step 555 $CP_M$ is set to zero thus $CP_M=0$ and the color filter position parameters $CP_C$ and $CP_Y$ are then in step 553 obtained as described below.

The effects of the two color filters, with a color filter position parameter greater than 0, $CP_C$ and $CP_Y$, on the light is determined:

$$SP_C = S^*(CP_C(F_C-1)+1) \quad \text{Equation 25:}$$

$$SP_{CY} = SP_C^*(CP_Y(F_Y-1)+1) \quad \text{Equation 60:}$$

where S is the predetermined characteristics of the light source; $SP_C$ is the characteristics of the light reduced by the first color filter applied according the first color filter position parameter $CP_C$; $F_C$ is the predetermined characteristics of the first color filter; $SP_{CY}$ is the characteristics of the light reduced by the first color filter applied according the first color filter position parameter $CP_C$ and by the third color filter applied according the third color filter position parameter $CP_Y$; $F_Y$ is the predetermined characteristics of the second color filter.

Equation 25 and Equation 60 are then combined:

$$SP_{CY} = S^*(1+CP_C(F_C-1)+CP_Y(F_Y-1)+CP_C CP_Y(F_C-1)(F_Y-1)) \quad \text{Equation 61:}$$

Setting up two vectors comprising the known and the unknown variables of Equation 27:

$$P_{CY} = [\, 1 \quad F_C-1 \quad F_Y-1 \quad (F_C-1)(F_Y-1) \,] \quad \text{Equation 62}$$

$$V_{CY} = \begin{bmatrix} 1 \\ CP_C \\ CP_Y \\ CP_C CP_Y \end{bmatrix} \quad \text{Equation 63}$$

where $P_{CY}$ comprises the known variables of Equation 62 and $V_{CY}$ comprises the unknown variables of Equation 62. Thus Equation 62 can then be written as:

$$SP_{CY} = S \cdot P_{CY} \cdot V_{CY} \quad \text{Equation 64:}$$

The X-, Y-, and Z-tristimulus values of the light $SP_{CY}$ reduced by the first color filter applied according to the first color filter position parameter $CP_C$ and by the second color filter applied according to the second color filter position parameter $CP_Y$, can be found by:

$$X = \Sigma_{i=m}^{n}(CIE_{X_i}{}^*S_i{}^*P_{CY_i})V_{CY} \quad \text{Equation 65:}$$

$$Y = \Sigma_{i=m}^{n}(CIE_{Y_i}{}^*S_i{}^*P_{CY_i})V_{CY} \quad \text{Equation 66:}$$

$$Z = \Sigma_{i=m}^{n}(CIE_{Z_i}{}^*S_i{}^*P_{CY_i})V_{CY} \quad \text{Equation 67:}$$

where X, Y and Z are respectively the X-, Y-, Z-tristimulus value of the emitted light after; m is the lower wavelength of visible light, n is the upper wavelength of visible light.

In order to simplify the following calculations, the values $X_{CY}$, $Y_{CY}$, and $Z_{CY}$ is defined as the combined spectrums for the X-, Y-, and Z-tristimulus values provided by the first and second color filter.

$$X_{CY} = \Sigma_{i=m}^{n}(CIE_{X_i}{}^*S_i{}^*P_{CY_i}) \quad \text{Equation 68:}$$

$$Y_{CY} = \Sigma_{i=m}^{n}(CIE_{Y_i}{}^*S_i{}^*P_{CY_i}) \quad \text{Equation 69:}$$

$$Z_{CY} = \Sigma_{i=m}^{n}(CIE_{Z_i}{}^*S_i{}^*P_{CY_i}) \quad \text{Equation 70:}$$

Utilizing the correlation between a color coordinate in the CIE color space and the tristimulus values as known in the art and as defined in Equation 40 and Equation 41; substituting into Equation 65 to Equation 70 into Equation 40 and Equation 41; inserting the coordinates of the resulting color $C_R(x_T, y_T)$ and isolating $V_{CY}$:

$$0 = (x_T(X_{CY}+Y_{CY}+Z_{CY})-X_{CY})V_{CY} \quad \text{Equation 71:}$$

$$0 = (y_T(X_{CY}+Y_{CY}+Z_{CY})-Y_{CY})V_{CY} \quad \text{Equation 72:}$$

To simplify the following calculations, $T_{x,CY}$ and $T_{y,CY}$ is used to describe the effect of the predetermined characteristics of the light source combined with the predetermined characteristics of the first and second color filters where:

$$T_{x,CY} = [x_T X_{CY} \; x_T Y_{CY} \; x_T Z_{CY} - X_{CY}] \quad \text{Equation 73:}$$

$$T_{y,CY} = [y_T X_{CY} Y_T Y_{CY} \; y_T Z_{CY} - Y_{CY}] \quad \text{Equation 74:}$$

Thus Equation 71 and Equation 72 can be written as:

$$0 = V_{CY} \cdot T_{x,CY} \quad \text{Equation 75:}$$

$$0 = V_{CY} \cdot T_{y,CY} \quad \text{Equation 76:}$$

Combining Equation 75 and Equation 76 to eliminate $CP_C$ yields:

$$0 = CP_Y^2(T_{x,CY}[3]T_{y,CY}[4]-T_{x,CY}[4]T_{x,CY}[3])+CP_Y \\ (T_{x,CY}[3]T_{x,CY}[2]+T_{x,CY}[1]T_{y,CY}[4]-T_{x,CY}[2]T_{x,CY} \\ [3]-T_{x,CY}[4]T_{y,CY}[1])+T_{x,CY}[1]T_{y,CY}[2]-T_{x,CY}[2] \\ T_{y,CY}[1] \quad \text{Equation 77:}$$

where $T_{x,CY}[n]$ is the $n^{th}$ position in the n×1 matrix $T_{x,CY}$, and $T_{x,CY}[n]$ is the $n^{th}$ position in the n×1 matrix $T_{y,CY}$. $T_n[1]$ represents the light source without any color filters, $T_n[2]$ represents the light source with the influence of the first color filter based on the color filter position parameter $CP_C$, $T_n[3]$ represents the light source with the influence of the third color filter based on the color filter position parameter $CP_Y$, and T[4] represents the light source with the combined influence of the first and the third color filter based on the color filter position parameters $CP_C$ and $CP_Y$.

$CP_Y$ can be solved for as a quadric equation where a, b, and c is defined as:

$$a_{CY}=T_{x,CY}[3]T_{y,CY}[4]-T_{x,CY}[4]T_{x,CY}[3] \qquad \text{Equation 78:}$$

$$b_{CY}=T_{x,CY}[3]T_{x,CY}[2]+T_{x,CY}[1]T_{y,CY}[4]-T_{x,CY}[2]T_{x,CY}[3]-T_{x,CY}[4]T_{y,CY}[1] \qquad \text{Equation 79:}$$

$$c_{CY}=T_{x,CY}[1]T_{y,CY}[2]-T_{x,CY}[2]T_{y,CY}[1] \qquad \text{Equation 80:}$$

Using Equation 78, Equation 79 and Equation 80 $CP_Y$ can be found:

$$CP_Y = \frac{-b_{CY} \pm \sqrt{b_{CY}^2 - 4a_{CY}c_{CY}}}{2a_{CY}} \qquad \text{Equation 81}$$

and $CP_C$ can then be found using:

$$CP_C = \frac{-T_{x,CY}[3]CP_Y - T_{x,CY}[1]}{T_{x,CY}[2] + T_{x,CY}[4]CP_Y} \qquad \text{Equation 82}$$

Equation 81 provides two solutions for $CP_Y$ and consequently two solutions for the pair of filter position parameter $CP_Y$ and $CP_C$ fulfills the equations.

The $CP_C$ indicates a percentage value in range 0% to 100% defining to what extend the first color filter is shall be applied to the light and $CP_Y$ indicates a percentage value in range 0% to 100% defining to what extend the second color filter shall be applied to the light. Thus, the values of $CP_C$ and $CP_Y$ must both be between 0 and 1 in order provide a solution where the resulting color can be provided using the first and second color filter.

Thus as described previously in step 555 it is verified whether or not $CP_C$ and $CP_Y$ fulfills the physical requirements using:

$$0 \leq CP_Y \leq 1 \qquad \text{Equation 83:}$$

$$0 \leq CP_C \leq 1 \qquad \text{Equation 84:}$$

If the obtained filter color filter position parameters, which have not been set to zero previously, $CP_C$ and $CP_Y$, are physical achievable, then the method proceed to a step of arranging the color filters in relation to one another and in relation to the light based on the color filter position parameters. Thus if both Equation 59 and Equation 84 are fulfilled for the pair of color position parameters, $CP_Y$ and $CP_C$, then the color filters will be applied to the light accordingly.

Otherwise, in case that at least one of the obtained filter position parameters, which previously have not been set to zero, is not physical achievable. Then the step of setting one of said first, second or third filter position parameter to zero is repeated by setting a different filter position parameter to zero and the step of obtaining the other two filter position parameters is repeated using a different pair of other filter position parameters.

In this example if the second test performed in step 555 fails then in step 551 $CP_C$ is set to zero thus $CP_C=0$ and the color filter position parameters $CP_M$ and $CP_Y$ are then in step 553 obtained as described below.

The effects of the two color filters, with a color filter position parameter greater than 0, $CP_M$ and $CP_Y$, on the light source is determined:

$$SP_M=S^*(CP_M(F_M-1)+1) \qquad \text{Equation 85:}$$

$$SP_MY=SP_M^*(CP_Y(F_Y-1)+1) \qquad \text{Equation 86:}$$

where S is the predetermined characteristics of the light source; $SP_M$ is the characteristics of the light reduced by the second color filter applied according the second color filter position parameter $CP_M$; $F_M$ is the predetermined characteristics of the second color filter; $SP_{MY}$ is the characteristics of the light reduced by the second color filter applied according the second color filter position parameter $CP_M$ and by the third color filter applied according the third color filter position parameter $CP_Y$, $F_Y$ is the predetermined characteristics of the second color filter.

Equation 85 and Equation 86 are then combined:

$$SP_{MY}=S^*(1+CP_M(F_M-1)+CP_Y(F_Y-1)+CP_MCP_Y(F_M-1)(F_Y-1)) \qquad \text{Equation 87:}$$

Setting up two vectors comprising the known and the unknown variables of Equation 27

$$P_{MY} = [\,1 \quad F_M-1 \quad F_Y-1 \quad (F_M-1)(F_Y-1)\,] \qquad \text{Equation 88}$$

$$V_{MY} = \begin{bmatrix} 1 \\ CP_M \\ CP_Y \\ CP_M CP_Y \end{bmatrix} \qquad \text{Equation 89}$$

where $P_{MY}$ contains the known variables of Equation 87 and $V_{MY}$ contains the unknown variables of Equation 87, and Equation 87 can then be written as:

$$SP_{MY}=S \cdot P_{MY} \cdot V_{MY} \qquad \text{Equation 90:}$$

The X-, Y-, and Z-tristimulus values of the light $SP_{MY}$ reduced by the second color filter applied according the second color filter position parameter $CP_M$ and by the third color filter applied according the third color filter position parameter $CP_Y$, can be found by:

$$X=\Sigma_{i=m}^{n}(CIE_{X_i}*S_i*P_{MY_i})V_{MY} \qquad \text{Equation 91:}$$

$$Y=\Sigma_{i=m}^{n}(CIE_{Y_i}*S_i*P_{MY_i})V_{MY} \qquad \text{Equation 92:}$$

$$Z=\Sigma_{i=m}^{n}(CIE_{Z_i}*S_i*P_{MY_i})V_{MY} \qquad \text{Equation 93:}$$

where X, Y and Z are respectively the X-, Y-, Z-tristimulus value of the emitted light after; m is the lower wavelength of visible light, n is the upper wavelength of visible light.

In order to simplify the following calculations, the values $x_{MY}$, $Y_{MY}$, and $Z_{MY}$ is defined as the combined spectrums for the X-, Y-, and Z-tristimulus values provided by the first and second color filter.

$$X_{MY}=\Sigma_{i=m}^{n}(CIE_{X_i}*S_i*P_{MY_i}) \qquad \text{Equation 94:}$$

$$Y_{MY}=\Sigma_{i=m}^{n}(CIE_{Y_i}*S_i*P_{MY_i}) \qquad \text{Equation 95:}$$

$$Z_{MY}=\Sigma_{i=m}^{n}(CIE_{Z_i}*S_i*P_{MY_i}) \qquad \text{Equation 96:}$$

Utilizing the correlation between a color coordinate in the CIE color space and the tristimulus values as known in the art and as defined in Equation 40 and Equation 41, substituting into Equation 91 to Equation 96 into Equation 40 and Equation 41 inserting the coordinates of the resulting color $C_R(x_T, y_T)$ and isolating $V_{MY}$:

$$0 = (x_T(X_{MY} + Y_{MY} + Z_{MY}) - X_{MY})V_{MY} \quad \text{Equation 97:}$$

$$0 = (y_T(X_{MY} + Y_{MY} + Z_{MY}) - Y_{MY})V_{MY} \quad \text{Equation 98:}$$

To simplify the following calculations, $T_{x,MY}$ and $T_{y,MY}$ is used to describe the effect of the predetermined characteristics of the light source combined with the predetermined characteristics of the first and second color filters where:

$$T_{x,MY} = [x_T X_{MY} x_T Y_{MY} x_T Z_{MY} - X_{MY}] \quad \text{Equation 99:}$$

$$T_{y,MY} = [y_T X_{MY} y_T Y_{MY} y_T Z_{MY} - Y_{MY}] \quad \text{Equation 100:}$$

Thus Equation 97 and Equation 98 can then be written as:

$$0 = V_{MY} \cdot T_{x,MY} \quad \text{Equation 101:}$$

$$0 = V_{MY} \cdot T_{y,MY} \quad \text{Equation 102:}$$

Combining Equation 101 and Equation 102 to eliminate $CP_M$ yields:

$$0 = CP_Y^2(T_{x,MY}[3]T_{y,MY}[4] - T_{x,MY}[4]T_{x,MY}[3]) + CP_Y(T_{x,MY}[3]T_{y,MY}[2] + T_{x,MY}[1]T_{y,MY}[4] - T_{x,MY}[2]T_{y,MY}[3] - T_{x,MY}[4]T_{y,MY}[1]) + T_{x,MY}[1]T_{y,MY}[2] - T_{x,MY}[2]T_{y,MY}[1] \quad \text{Equation 103:}$$

where $T_{x,MY}v[n]$ is the $n^{th}$ position in the n×1 matrix $T_{x,MY}$, and $T_{y,MY}[n]$ is the $n^{th}$ position in the n×1 matrix $T_{y,MY}$. $T_n[1]$ represents the light source without any color filters, $T_n[2]$ represents the light source with the influence of the second color filter based on the second color filter position parameter $CP_M$, $T_n[3]$ represents the light source with the influence of the third color filter based on the color filter position parameter $CP_Y$, and $T_n[4]$ represents the light source with the combined influence of the second and the third color filter based on the color filter position parameters $CP_M$ and $CP_Y$.

$CP_Y$ can be solved for as a quadric equation where a, b, and c is defined as:

$$a_{MY} = T_{x,MY}[3]T_{y,MY}[4] - T_{x,MY}[4]T_{x,MY}[3] \quad \text{Equation 104:}$$

$$b_{MY} = T_{x,MY}[3]T_{y,MY}[2] + T_{x,MY}[1]T_{y,MY}[4] - T_{y,MY}[2]T_{y,MY}[3] - T_{x,MY}[4]T_{y,MY}[1] \quad \text{Equation 105:}$$

$$C_{MY} = T_{x,MY}[1]T_{y,MY}[2] - T_{x,MY}[2]T_{y,MY}[1] \quad \text{Equation 106:}$$

Using Equation 104, Equation 105 and Equation 106 $CP_Y$ can be found:

$$CP_Y = \frac{-b_{MY} \pm \sqrt{b_{MY}^2 - 4a_{MY}c_{MY}}}{2a_{MY}} \quad \text{Equation 107}$$

and $CP_C$ can then be found using:

$$CP_C = \frac{-T_{x,MY}[3]CP_Y - T_{x,MY}[1]}{T_{x,MY}[2] + T_{x,MY}[4]CP_Y} \quad \text{Equation 108}$$

Equation 107 provides two solutions for $CP_Y$ and consequently two solutions for the pair of filter position parameter $CP_Y$ and $CP_M$ fulfills the equations.

The $CP_M$ indicates a percentage value in range 0% to 100% defining to what extend the second color filter is shall be applied to the light and $CP_Y$ indicates a percentage value in range 0% to 100% defining to what extend the third color filter shall be applied to the light. Thus, the values of $CP_M$ and $CP_Y$ must both be between 0 and 1 in order provide a solution where the resulting color can be provided using the second and third color filter.

Thus as described previously in step it is verified whether or not $CP_M$ and $CP_Y$ fulfills the physical requirements using:

$$0 \leq CP_Y \leq 1 \quad \text{Equation 109:}$$

$$0 \leq CP_M \leq 1 \quad \text{Equation 110:}$$

If the obtained filter color filter position parameters, which have not been set to zero previously, $CP_M$ and $CP_Y$, are physical achievable, then method proceed to a step of arranging the color filters in relation to one another and in relation to the light based on the color filter position parameters. Thus if both Equation 59 and Equation 110 are fulfilled for the pair of color position parameters, $CP_Y$ and $CP_M$, then the color filters will be applied to the light accordantly.

It is expected that a physical possible solution will be found after repeating step 551, 553 and 555 three times, otherwise the received color parameter and the received color temperature parameter received in step 230 indicate a color and color temperature which cannot be created using the combination of the light source and the color filters.

In such situation the method can comprise a step of adjusting the receive color parameter and received color temperature parameters for instance by adjusting the received color parameter and received color temperature correction parameters so they reflect a color and color temperature parameter which can be achieved by the light source and the color filters. Alternatively the method can comprise a step of adjusting the coordinates of the resulting color $C_R(x_T, y_T)$ so a coordinate which lies within the color gamut in the CIE color space which reflects the colors which can be made by the combination of color filters and light source. For instance by identifying the coordinate inside the color gamut which is closest to the coordinate of the resulting color $C_R(x_T, y_T)$ and the use the adjusted resulting color $C_R(x_T, y_T)$ when obtaining the color filter positions.

The step 239 of the method is positioning the color filters inside the source light beam width based on the color filter position parameter obtained previously. This can for instance be achieved by utilizing actuators which can move the corresponding filters in relation to the light beam and thereby position the color filters accordantly in the light beam.

It is noted that $X_{CM}$, $Y_{CM}$, $Z_{CM}$ defined in Equation 37, Equation 38 and Equation 39 and forming part of $T_{x,CM}$ and $T_{y,CM}$ defined in Equation 46 and Equation 47 are constants and can be calculated and stored in the memory whereby they can be provided as inputs to step 553 of obtaining the color position parameters. $X_{CM}$, $Y_{CM}$, $Z_{CM}$ can be obtained based on the spectral characterizes of the first and second color filters and spectral characteristic of the light.

Similar $X_{CY}$, $Y_{CY}$, $Z_{CY}$ defined in Equation 68, Equation 69, Equation 70 and forming part of $T_{x,CY}$ and $T_{y,CY}$ defined in Equation 73 and Equation 74 are constants and can be calculated and stored in the memory whereby they can be provided as inputs to step 553 of obtaining the color position parameters. $X_{CY}$, $Y_{CY}$, $Z_{CY}$ can be obtained based on the spectral characteristics of the first and third color filters and spectral characteristic of the light.

Similar $x_{MY}$, $Y_{MM}$, $Z_{MY}$ defined in Equation 94, Equation 95 and Equation 96 forming part of $T_{x,MY}$ and $T_{y,MY}$ defined in Equation 99 and Equation 100 are constants and can be calculated and stored in the memory whereby they can be provided as inputs to step 553 of obtaining the color position parameters. $X_{MY}$, $Y_{MY}$, $Z_{MY}$ can be obtained based on the spectral characterizes of the second and third color filters and spectral characteristic of the light.

What is claimed is:

1. A method of controlling a light fixture, comprising:
   receiving at least one color parameter and at least one color temperature parameter, wherein:
   the light fixture includes (i) at least one light source emitting a first light having a spectral characteristic, and (ii) a set of color filters, each color filter in the set of color filters having a predetermined spectral filter characteristic included in a set of predetermined spectral filter characteristics,
   the at least one color parameter is associated with a position of at least one color filter included in the set of color filters, and
   the at least one color temperature parameter is associated with a color temperature of the first light;
   obtaining, based on each of the at least one color parameter, the at least one color temperature parameter, and the set of predetermined spectral filter characteristics, a resulting color of the first light;
   obtaining, based on the resulting color, the set of predetermined spectral filter characteristics, and the spectral characteristic of the first light, a set of color filter position parameters indicating positions of the color filters in relation to the first light; and
   arranging, based on the set of color filter position parameters, the set of color filters in positions relative to the first light.

2. The method of claim 1, wherein obtaining the resulting color comprises:
   emulating a light source emitting emulated light having an emulated spectral characteristic;
   generating a resulting spectrum by applying the set of color filters to the emulated spectral characteristic according to the at least one color parameter; and
   obtaining the resulting color based on the resulting spectrum.

3. The method of claim 2, wherein generating the resulting spectrum comprises convolving, based on the at least one color parameter, the emulated spectral characteristic with the set of predetermined spectral filter characteristics of the set of color filters.

4. The method of claim 2, wherein:
   the emulated spectral characteristic corresponds to a black-body radiation having a color temperature; and
   the color temperature of the black-body radiation is obtained based on the color temperature parameter.

5. The method of claim 2, wherein the resulting color is further obtained based on the spectral characteristic of the first light emitted by the light source and a second set of predetermined spectral filter characteristics of an emulated color correction filter, and obtaining the resulting color comprises:
   generating a resulting spectrum by:
   applying the set of color filters to the first light emitted by the light source according to the at least one color parameter, and
   applying the emulated color correction filter to the first light emitted by the light source according to the color temperature parameter; and
   obtaining, based on the resulting spectrum, the resulting color.

6. The method of claim 5, wherein generating the resulting spectrum comprises convolving the spectrum of the first light emitted by the light source with the set of predetermined spectral filter characteristics of the set of color filters based on the at least one color parameter and with the second set of predetermined spectral filter characteristics of the emulated color correction filter.

7. The method of claim 2, wherein obtaining the resulting color comprises obtaining tri-stimulus values of light having the resulting spectrum.

8. The method of claim 7, wherein obtaining the resulting color comprises obtaining a coordinate of the resulting color in a CIE color space chromaticity diagram based on the tri-stimulus values.

9. The method of claim 1, wherein obtaining color filter position parameters indicating positions of the set of color filters in relation to the first light comprises:
   setting one of a first, a second, or a third filter position parameter to zero, wherein the first, the second, and the third filter position parameters are included in the set of color filter position parameters;
   obtaining, based on the resulting color, the other two filter position parameters, wherein the set of predetermined spectral filter characteristics of the set of color filters and the spectral characteristic of the first light emitted by the light source; and
   determining if the obtained other two filter position parameters are physical achievable; and
   if the obtained other two filter position parameters are physical achievable, proceed to the step of arranging the set of color filters in relation to one another and in relation to the first light; or
   if at least one of the obtained other two filter position parameters is not physical achievable:
   repeat the step of setting one of the first, second or third filter position parameter to zero by setting a different filter position parameter to zero; and
   repeating the step of obtaining the other two filter position parameters using a different pair of other filter position parameters.

10. The method of claim 1, further comprising determining if the resulting color can be created by the light source and the set of color filters.

11. The method of claim 10, further comprising, upon determining that the resulting color cannot be created by the light source and the set of color filters, adjusting the resulting color to an adjusted resulting color that can be created by the light source and the set of color filters.

12. A light fixture comprising:
    at least one light source emitting a first light having a spectral characteristic;
    a set of color filters that include a first color filter, a second color filter and a third color filter, wherein:
    each color filter has a predetermined spectral filter characteristic included in a set of predetermined spectral filter characteristics, and
    a control unit configured to arrange the set of color filters by:
    receiving at least one color parameter and at least one color temperature parameter, wherein:
    the least one color parameter is associated with a position of at least one color filter included in the set of color filters, and
    the at least one color temperature parameter is associated with a color temperature of the first light,
    obtaining, based on each of the at least one color parameter, the at least one color temperature parameter, and the set of predetermined spectral filter characteristics, a resulting color of the first light, obtaining, based on the resulting color, the set of predetermined spectral filter characteristics, and the spectral characteristic of the first light, a set of color filter position parameters indicating positions of the color filters in relation first light, and arranging, based on the color filter position parameters, the set of color filters in positions relative to the first light.

13. The light fixture of claim 12, wherein the control unit further arranges the set of color filters by generating, based on the set of color filter position parameters, a set of activation signals for a set of actuators, wherein:

each actuator in the set of actuators corresponds to a color filter in the set of color filters, and each activation signal in the set of activation signals indicates a position of the color filter in the set of color filters in relation to the first light.

14. The light fixture of claim 12, further comprising a receiver that receives an input signal that indicates the at least one color parameter and the at least one color temperature parameter.

15. The light fixture of claim 12, wherein:

the first color filter is a cyan color filter embodied as a spectral band pass filter allowing light in a cyan region of the light to pass, the second color filter is a magenta color filter embodied as a spectral band pass filter allowing light in a magenta region of the light to pass, the third color filter is a yellow color filter embodied as a spectral band pass filter allowing light in a yellow region of the light to pass.

16. One or more non-transitory computer-readable media storing instructions that, when executed by one or more processors included in a light fixture, cause the one or more processors to perform the steps of:

receiving at least one color parameter and at least one color temperature parameter, wherein:

the light fixture includes (i) at least one light source emitting a first light having a spectral characteristic, and (ii) a set of color filters, each color filter in the set of color filters having a predetermined spectral filter characteristic included in a set of predetermined spectral filter characteristics, the at least one color parameter is associated with a position of at least one color filter included in the set of color filters, and the at least one color temperature parameter is associated with a color temperature of the first light;

obtaining, based on each of the at least one color parameter, the at least one color temperature parameter, and the set of predetermined spectral filter characteristics, a resulting color of the first light;

obtaining, based on the resulting color, the set of predetermined spectral filter characteristics, and the spectral characteristic of the first light, a set of color filter position parameters indicating positions of the color filters in relation to the first light; and arranging, based on the set of color filter position parameters, the set of color filters in positions relative to the first light.

\* \* \* \* \*

UNITED STATES PATENT AND TRADEMARK OFFICE
CERTIFICATE OF CORRECTION

PATENT NO. : 10,880,963 B2  
APPLICATION NO. : 16/000870  
DATED : December 29, 2020  
INVENTOR(S) : Jesper Torsvik Toft Page 1 of 1

It is certified that error appears in the above-identified patent and that said Letters Patent is hereby corrected as shown below:

In the Claims

Column 25, Claim 15, Line 28, please delete "pass," and insert --pass, and--.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*